(12) United States Patent
Ackerman

(10) Patent No.: US 10,532,935 B2
(45) Date of Patent: Jan. 14, 2020

(54) WATER HARVESTER AND PURIFICATION SYSTEM AND METHOD OF MAKING AND USING SAME

(71) Applicant: John R. Ackerman, Hazle Township, PA (US)

(72) Inventor: John R. Ackerman, Hazle Township, PA (US)

( * ) Notice: Subject to any disclaimer, the term of this patent is extended or adjusted under 35 U.S.C. 154(b) by 0 days.

(21) Appl. No.: 16/052,520

(22) Filed: Aug. 1, 2018

(65) Prior Publication Data

US 2018/0362365 A1    Dec. 20, 2018

Related U.S. Application Data

(63) Continuation-in-part of application No. 14/916,497, filed on Mar. 3, 2016, now Pat. No. 10,071,918.
(Continued)

(51) Int. Cl.
    *C02F 1/04*      (2006.01)
    *C02F 1/14*      (2006.01)
(Continued)

(52) U.S. Cl.
CPC ............... *C02F 1/048* (2013.01); *B01D 1/14* (2013.01); *B01D 5/006* (2013.01); *C02F 1/10* (2013.01); *C02F 1/14* (2013.01); *C02F 11/04* (2013.01); *C02F 2103/08* (2013.01); *C02F 2103/10* (2013.01); *C02F 2201/009* (2013.01)

(58) Field of Classification Search
CPC ... C02F 1/048; C02F 1/10; C02F 1/14; B01D 1/14; B01D 3/007; B01D 5/006
See application file for complete search history.

(56) References Cited

U.S. PATENT DOCUMENTS 3,777,456 A    12/1973   Lund
4,267,124 A     5/1981   Hardy et al.
(Continued)

FOREIGN PATENT DOCUMENTS

WO      2011/018242      2/2011

*Primary Examiner* — Jonathan Miller
(74) *Attorney, Agent, or Firm* — Zale Patent Law, Inc.; James R. McDaniel; Lawrence P. Zale

(57) ABSTRACT

A system for producing potable water, including a primary water harvester including a non-potable water source, gas heating chamber, wherein the gas heating chamber includes a gas directing tube having a gas located within the gas directing tube such that the gas heating chamber is used to heat the gas located within the gas directing tube, a gas mover operatively connected to the gas directing tube for moving the heated gas contained within the gas directing tube, an evaporator operatively connected at one end to the gas directing tube, wherein the heated gas located within the gas directing tube contacts non-potable from the non-potable water source such that a water vapor in the heated gas is increased, and a condenser operatively connected to the other end of the evaporator, wherein the condenser causes the water vapor to condense out of the heated gas to produce potable water. A secondary function of the system allows it to act as a concentrator for organic and inorganic components present in the non-potable water that can be considered additional resources to be recovered in addition to the potable water produced by the system.

20 Claims, 28 Drawing Sheets

Related U.S. Application Data

(60) Provisional application No. 61/890,596, filed on Oct. 14, 2013.

(51) Int. Cl.
*C02F 1/10* (2006.01)
*B01D 1/14* (2006.01)
*B01D 5/00* (2006.01)
C02F 103/10 (2006.01)
C02F 11/04 (2006.01)
C02F 103/08 (2006.01)

(56) References Cited

U.S. PATENT DOCUMENTS

| | | | | |
|---|---|---|---|---|
| 7,073,337 | B2* | 7/2006 | Mangin | B01D 3/007 60/783 |
| 7,886,557 | B2* | 2/2011 | Anderson | B01D 5/0072 62/272 |
| 8,623,174 | B1* | 1/2014 | Duesel, Jr. | B01D 1/14 159/16.1 |
| 2004/0040322 | A1* | 3/2004 | Engel | E03B 3/28 62/177 |
| 2007/0151262 | A1 | 7/2007 | Bailey | |
| 2008/0277261 | A1* | 11/2008 | Paxton | B01D 1/0041 202/180 |
| 2008/0277262 | A1* | 11/2008 | Harris | B01D 1/0047 203/10 |
| 2010/0083675 | A1* | 4/2010 | Merritt | E03B 3/28 62/93 |
| 2013/0145782 | A1 | 6/2013 | Ritchey | |
| 2013/0178987 | A1 | 7/2013 | Meirav | |
| 2016/0368785 | A1* | 12/2016 | Zamir | C02F 1/16 |
| 2017/0008776 | A1* | 1/2017 | Zemmouri | B01D 1/14 |
| 2018/0361302 | A1* | 12/2018 | Tan | B01D 53/44 |

* cited by examiner

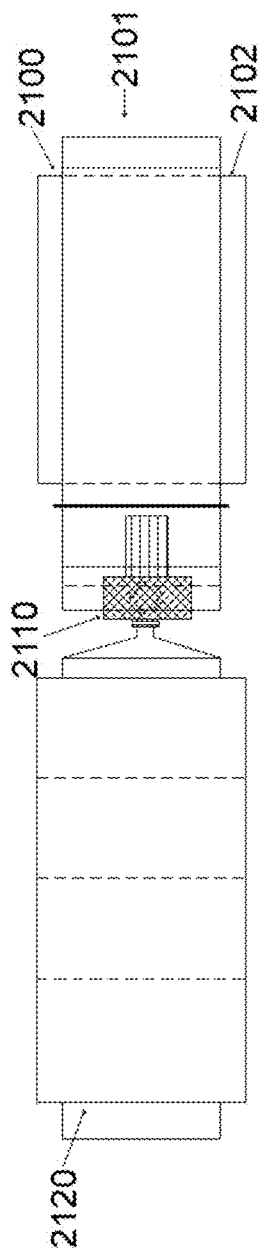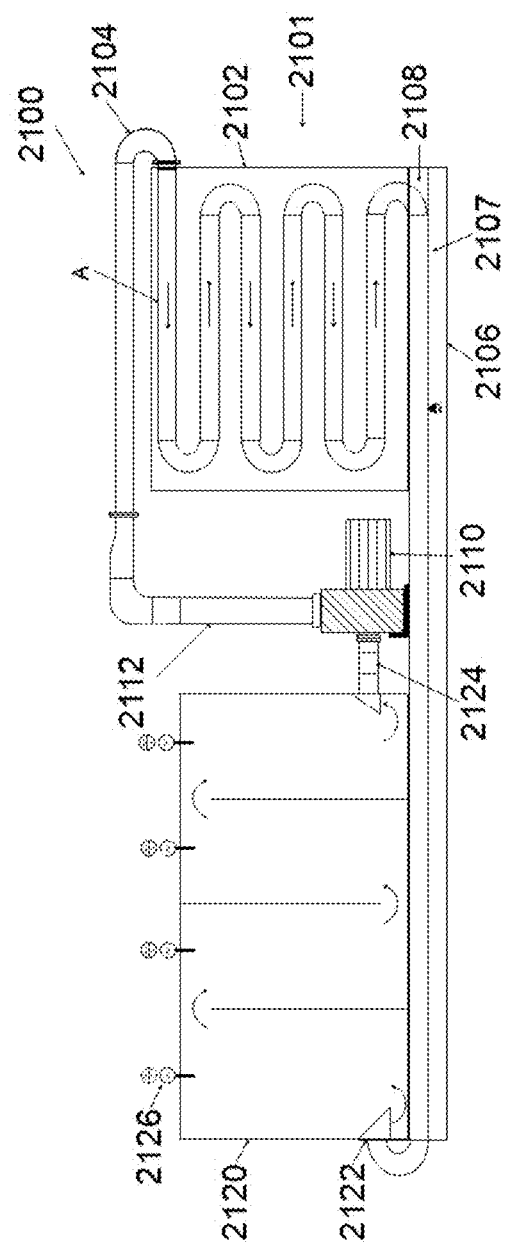
Figure 27
Figure 28

WATER HARVESTER AND PURIFICATION SYSTEM AND METHOD OF MAKING AND USING SAME

CROSS REFERENCE TO RELATED APPLICATIONS

This application is a continuation-in-part application of pending U.S. patent application "Water Harvester and Purification System", Ser. No. 14/916,497, filed on Mar. 3, 2016 which is the National Stage of PCT/US14/59998 filed Oct. 10, 2014, that claims priority to U.S. Provisional Application "Water Harvester" Ser. No. 61/890,596 filed on Oct. 14, 2013, all of which are incorporated by reference as if added in their entirety to the extent that they do not conflict with the current application.

BACKGROUND

1. Field of Invention

The present invention relates generally to apparatus designed to harvest moisture and purify non-potable water, and more particularly, to harvest moisture and purify non-potable water to produce potable water.

2. Description of Related Art

Increasing population requires more clean water. Urban population growth will increase demand for household water, and the need for clean, potable water will increase. Conventional water supplies will run short because of increased demand and local overuse of natural water supplies.

Large amounts of potable water are currently being used by industries which release chemicals into the water that make the water unfit for drinking. One industry use which requires large amounts of water is hydraulic fracking. Much of the fracking solutions are not purified, further reducing the clean water supply.

Some non-operational industries, such as the coal mining industry have ceased operations in certain areas. Since some of them went bankrupt, they have left abandoned mines which now release large amounts of mine drainage into waterways.

Similarly, sometimes wastewater, water contaminated with microorganisms, pharmaceuticals and fertilizers make large amounts of water unfit for drinking.

Another source of non-potable water is salt water, such as seawater or brackish water. Salt water can be desalinated to create fresh water by conventional methods; however, these are not practical in certain regions. The best-known methods for desalinization are a) vacuum evaporation by boiling, b) distillation or c) reverse osmosis.

Unfortunately, boiling and distillation requires significant energy to operate efficiently and the resultant cost of treated water puts this technology out of reach for the majority in need. Desalination plants exist in rich nations such as the United States and Saudi Arabia but are not feasible everywhere due to the costs. The lack of capital in developing nations makes large desalination plants with high-volume production impractical.

Another method of desalinating salt water is by using reverse osmosis. Desalinating by reverse osmosis requires placing water under high pressure and forcing the water through porous membranes. The pores are sized to allow water molecules through but do not pass charged ions, such as salt ions. Reverse osmosis requires equipment to raise the water pressure to high levels, again requiring significant energy. Reverse osmosis also only results in a small volume of clean water being produced. Therefore, while it is not very economical or efficient to use reverse osmosis for desalination, it is the most widely used method for desalination, despite its high costs.

Even if one were to use one of these methods, they typically are done in stationary plants and the clean water would have to be transported to where it is needed. Producing potable water near its place of use removes the requirement for transporting the water to where it is needed. Therefore, pipelines, canals or tanker trucks are not required. However, it is to be understood that the present invention can be utilized in stationary plants.

Production of high-quality water at or near its place of use is superior to transporting drinking water, which requires substantial consumption of energy for delivery and if bottled, container waste disposal.

Another source of water is moisture in the air. Current technology exists that utilizes fans, pumps, and refrigeration units to extract water vapor from the air; however, it is dependent on electricity or fossil fuels to power the devices. These technologies are not suitable for much of the world's population where artificial power sources are not readily available.

There currently is a global need for cost-effective, simple, efficient, stationary and mobile systems for producing potable water where it is needed.

SUMMARY

One embodiment of the present invention takes the form of an apparatus capable of harvesting atmospheric water. The apparatus includes a harvester comprised of a thin sheet of material connected to a cooling source. As the surface of the thin sheet is cooled, evaporated water condenses and precipitates on to the thin sheet. The precipitated water is then collected.

Another embodiment of the present invention may take the form of a desalinization apparatus. In this embodiment, seawater or other brine may be loaded into a basin and evaporated. The process of evaporation separates fresh water from the minerals. The evaporated water may then be brought in proximity to the thin sheet, thereby condensing and collecting the fresh water.

Still another embodiment of the present invention may take the form of a wastewater treatment apparatus. In this embodiment, municipal or industrial wastewaters may be loaded into one or more process vessels. The wastewater may then be evaporated, with fresh water condensing on the thin sheet.

An embodiment of the current invention may be described as a system for producing potable water having a fan for creating an air stream of ambient air and a condenser within the air stream having a number of conduits adapted to carry a liquid coolant. The liquid coolant reduces the temperature of the condenser and surrounding air below the dew point of the ambient air, causing moisture in the ambient air to condense on the condenser.

A cooling device that runs on electric power is coupled to the conduits and is adapted to lower the temperature of the liquid coolant below a dew point of the ambient air.

A solar photovoltaic device creates electric power to power the system.

A plurality of sensors is adapted to measure physical parameters of the system and provide their measurements to a control unit coupled to the sensors. The control unit is also coupled to the fan, the cooling device and the photovoltaic device and can read information from the sensors and adjust elements of the system accordingly to optimize operation of the system.

The current invention may also be embodied as a system for producing potable water from non-potable water having an evaporator with a chamber for receiving, containing and heating a stream of air, a second chamber for receiving non-potable water having an air passageway in contact with the non-potable water and an airflow exit, at least one passageway fluidically connecting the first chamber to the second chamber allowing the heated stream of air to pass from the first chamber through the second chamber and out of the airflow exit, thereby increasing the amount of water vapor in the air stream leaving the airflow exit. The system also includes a condenser fluidically coupled to the airflow exit of the evaporator adapted to receive the moist airstream, a number of condensation surfaces cooled by a coolant to a temperature below the dew point, causing the moist airstream to condense the water vapor in the air stream into potable liquid water. At least one cooling unit is adapted to cool the coolant to a temperature below the dew point of the moist air. A plurality of sensors measures physical parameters of the system. A control unit is coupled to the sensors, the fan, the cooling device and the photovoltaic device. The control unit reads information from the sensors and adjusts elements of the system accordingly to optimize operation of the system. The system is powered by a solar photovoltaic device adapted to create electric power. There also may be a windmill driving an electric generator acting to power the system. Battery storage may be employed to store electricity for later use. In alternative embodiments, the system also employs at least one pressure sensor adapted to measure pressure within the conduit; and the control unit is coupled to the pressure sensors and fan for interactively measuring the pressure within the vessel to adjust the fan operation to optimize condensation.

The system may also employ a number of temperature sensors adapted to measure temperature at various locations within the conduit, and a heating device in the evaporator. The control unit is coupled to at least one of the temperature sensors and the heating device for interactively measuring the temperature within the vessel to adjust the heater operation to optimize evaporation.

The current invention may also be embodied as a system for creating potable water from non-potable water employing an evaporator section employing a plurality of evaporators, with each evaporator having an input for receiving input air and an output for exhausting air. Each evaporator is adapted to evaporate non-potable water into an input air stream received at its input and to create a moist air stream at its output. The evaporators are connected in series such that the output of one is coupled to the input of the next. The system also employs at least one humidity sensor near the input of each evaporator capable of determining the relative humidity, a bypass conduit which bypasses at least one evaporator, at least one bypass valve adapted to divert the moist air stream to the bypass conduit when activated, a control unit coupled to the humidity sensors and at least one bypass valve, adapted to sense when the humidity of the moist air stream exceeds a predetermined level and to activate at least one bypass valve causing the moist air stream to bypass at least one evaporator, and a condenser for receiving the moist air stream and condensing potable water from the moist air stream.

These and other advantages and features of the present invention will become apparent to those of ordinary skill in the art upon reading this disclosure in its entirety.

BRIEF DESCRIPTION OF THE DRAWINGS

The advantages of the instant disclosure will become more apparent when read with the exemplary embodiment described specification and shown in the drawings, wherein:

FIG. 27 shows a plan view of a third embodiment of a closed-loop air heating chamber, according to the present invention.

FIG. 28 shows an elevational view the closed-loop air heating chamber of FIG. 27, according to the present invention.

DETAILED DESCRIPTION

Figure 1:
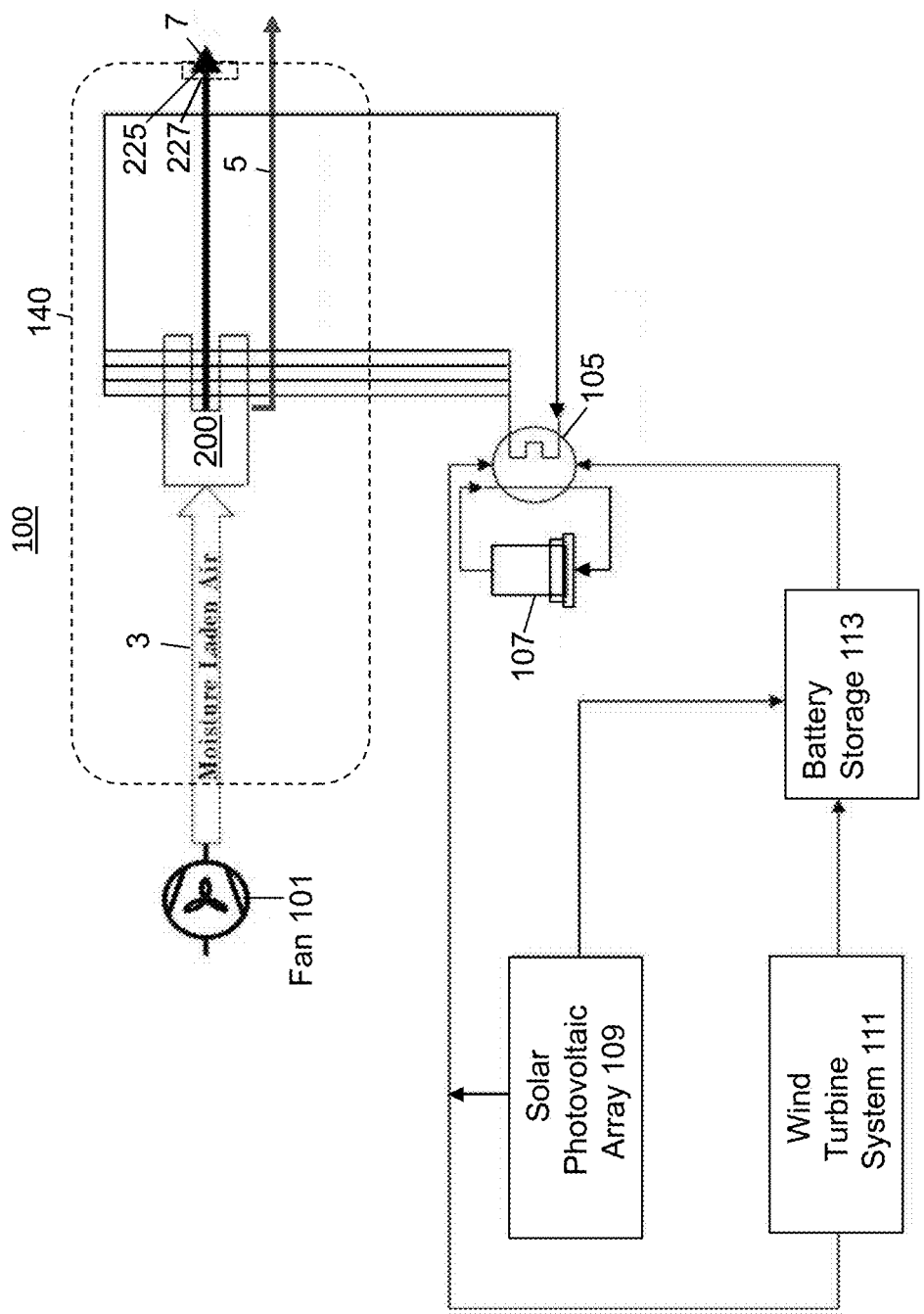
FIG. 1 is an overall block diagram of one embodiment of a water harvesting system for extracting water from the air according to the present invention.

The present invention will now be described in detail by describing various illustrative, non-limiting embodiments thereof with reference to the accompanying drawings. The invention may, however, be embodied in many different forms and should not be construed as being limited to the illustrative embodiments set forth herein. Rather, the embodiments are provided so that this disclosure will be thorough and will fully convey the concept of the invention to those skilled in the art. The claims should be consulted to ascertain the true scope of the invention.

The conventional methods of distillation and reverse osmosis are not feasible in the third world countries where the water is needed the most. The device and process proposed in this application use neither of these methods. It is an evaporative method that uses the natural process of evaporation of a liquid into air.

The proposed process is the opposite of conventional evaporation devices wherein the water is heated to move the water molecules from the liquid phase to the vapor phase. In this device, the air is heated so that the water-carrying capacity of the air increases over the water-carrying capacity available at lower temperatures. This alone does not produce high rate evaporation, as the air at the water/air interface becomes rapidly saturated with water vapor and the rate of evaporation decreases significantly and rapidly. To effect high rate evaporation of the water volume, the saturated air at the water/air boundary must be removed and replaced with moisture-deficient air. A fan or blower may be used to affect this movement from the evaporator unit.

Constrained Optimization

The system of the current application is optimized to produce high rate production of potable water for the least cost that is compatible with existing resources. Since the water is intended to be potable, there must be less than a predetermined acceptable level of contaminants. The evaporator and the condenser are each optimized for the least cost to produce the required amount of potable water.

Evaporator Optimization

To optimize the evaporator, one would like to increase the surface area interaction between the water and the air. On way to do this is by creating a microclimate near the water. A microclimate is a local atmospheric zone where the climate differs from the surrounding area. Thereby by at least partially enclosing a volume near the water's surface, humidity near the water surface creates a microclimate. The airflow then carries humid air from this microclimate away. One would also try to increase the air flow rate to increase the amount of potable water produced. Therefore, bubbling the air through the non-potable water would increase surface area interaction; however, at higher flow rates this causes droplets to become entrained in the air stream, contaminating it, making the water non-potable.

Therefore, it was found that running a laminar air stream over the non-potable water would cause the water to evaporate into the air stream at high volumetric flow rates. If the air stream has laminar flow, few droplets become entrained in the air steam, even at higher air velocities. This allows more throughput of the water vapor.

It was also determined that a large surface area having laminar air stream rather than a turbulent air stream passing over the surface of the non-potable water achieved very good results. It was also determined that only the air adjacent the water surface received water vapor. Therefore, the height of the air flow chamber was minimized to maximize air relative humidity and keep the flow laminar.

Condenser Optimization

It was determined that using metal sheeting with common metal piping material that was either cast or fabricated was the most cost-effective way to make condensers while achieving acceptable heat transfer efficiency. Again, creating a local microclimate around the condenser surface creates cooled air which interacts with the moist humid air, causing precipitation even before the moist air touches the condenser surfaces. The efficiency of this design was measured for various temperatures. The square footage required to condense the water vapor provided by the evaporator was then determined.

To convert the water from the vapor phase back to the liquid phase a condenser must be used to create microclimate where the temperature surrounding the condenser unit is lowered to a point below the dew point of the air wherein upon contact with the microclimate and the condenser surface, the water will condense through precipitation. The now moisture-deficient air is directed back to the evaporator unit. The salts or contaminants present in the original water source remain behind in the concentrate left in the evaporator and the precipitated water is potable and ready for human consumption.

Embodiments

The embodiments of this application may be classified into three categories, such as those that:

1) directly remove moisture from the atmosphere, referred to as a 'water harvesting system',
2) desalinate salt water, referred to as a 'desalination system', and
3) purify contaminated water, or non-potable water in the environment, such as from a river stream, settling pond, lake, or other body of water, referred to as a 'water purification system'.

1) Water Harvesting System

The water harvesting device designed for atmospheric operation condenses water directed to the unit from the atmosphere where it precipitates as it contacts the microclimate modifications surrounding the condensation panels.

While there will be some condensation of the moisture as it comes in contact with the panels, the majority of the condensation will occur in the zone of cooled air surrounding the panel surface where the dew point of the air mass is reduced in relation to the dew point of the air carrying the moisture effecting rapid condensation of the water molecules.

Embodiments of the invention are discussed below with reference to FIGS. 1-7. However, those skilled in the art will readily appreciate that the detailed description given herein with respect to these figures is for explanatory purposes as the invention extends beyond these limited embodiments.

FIG. 1 is a block diagram of a water harvester apparatus 100 for extracting moisture from the atmosphere. The apparatus 100 is comprised, in part, of a condenser 200 connected to a coolant device 105, which may be a water chiller or any device which cools a circulating fluid capable of transferring heat referred to as a coolant. The coolant device 105 receives and cools the coolant passing through condenser 200. In preferred embodiments of the present invention, a fan 101 is included to direct ambient moisture laden air 3 through the condenser 200. It also may include a cooling tower 107 that couples with the coolant device 105 to absorb the heat extracted by the coolant device 105 and dissipate the heat through the cooling tower 107.

Preferred embodiments also include a power source that may take the form of a storage battery 113 fed by a solar photovoltaic device 109 and/or wind turbine system 111. The power source is used to operate the coolant device 105 and is able to do so where power is unavailable.

In an alternative embodiment, the condenser 200 may be enclosed in a containment vessel 115 having an air flow valve at an air exit, where the dry air 7 exits the system. By using the fan 101 to force air into the containment vessel 115, a slightly higher air pressure is created. Since air releases moisture as pressure decreases, this further increases the amount of potable water 5 created. The air flow valve 225 is adjustable so that the amount of flow and the pressure may be adjusted to optimize the potable water 5 created. Optionally, a control unit may monitor the pressure inside of the containment vessel 115 and operate the air flow valve 225 to interactively optimize the water harvester system 100.

Figure 2:
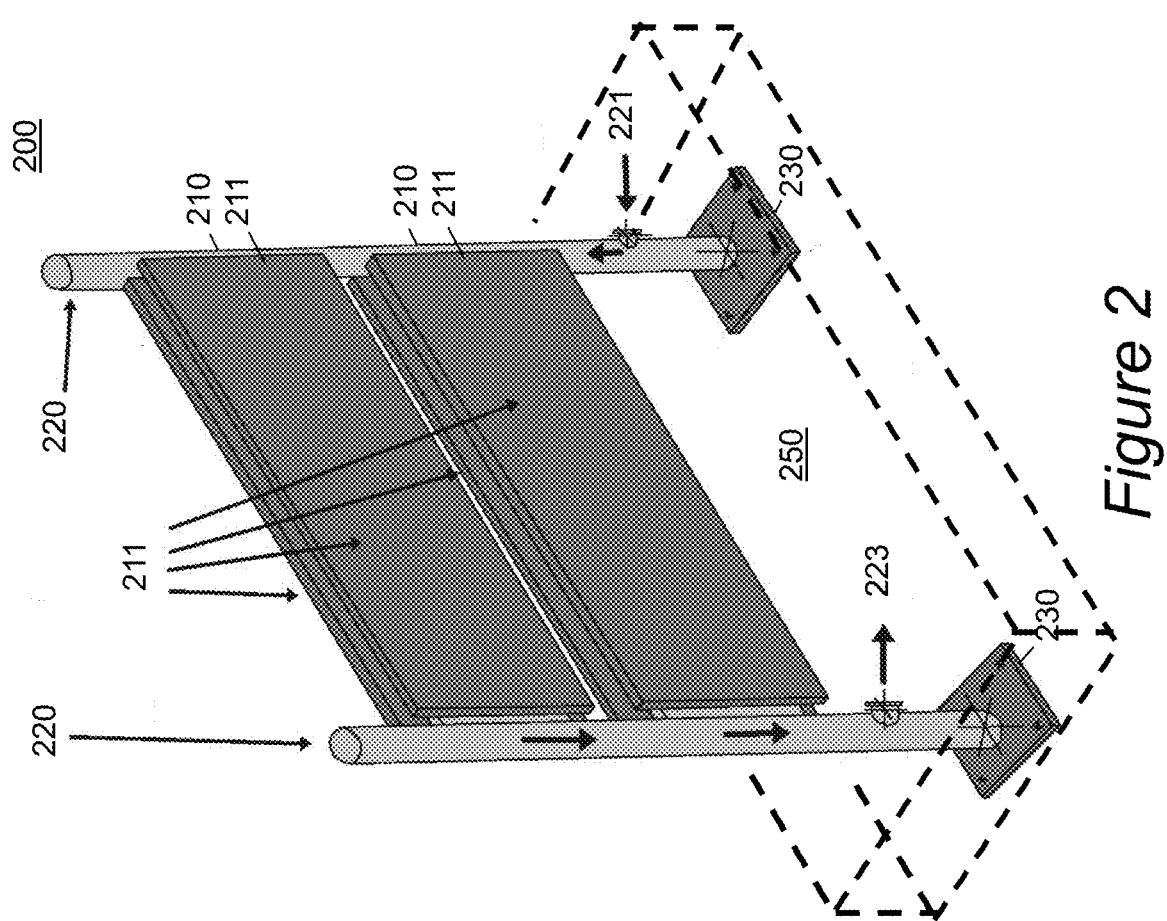
FIG. 2 is a diagram of one embodiment of a condenser section according to the present invention.

FIG. 2 shows a preferred embodiment of the condenser 200 of FIG. 1. The condenser 200 may be mounted to a base using mounting supports 230. It may also include a plurality of panels 210 arranged above each other. The panels 210 in one embodiment are covered with thin metal sheets each referred to as a collection surface 211. The panels 210 are preferably manufactured of thin-gage stainless steel and have varying dimensions dependent on the water volume and condensation rate desired. In certain embodiments, the sheet dimensions are approximately 8 feet wide×6 feet high with an overall height of 12 feet. It is to be understood that the sheet dimensions could also be as small as 2 feet wide×2 feet high.

A coolant at a low temperature enters the inlet 221 of the distribution piping 220. The coolant flows through the distribution piping 220 and through the panels 210 to the distribution piping 220 on the opposite side of the panels 210 and out of the outlet 223. The purpose is to cool the collection surfaces 211 below the dew point to cause condensation of moisture in the air impacting the collection surfaces 211 and the cooled air volume (microclimate) surrounding the collection surfaces. The moisture that condenses is pure, potable water and falls into an optional collection basin 250 which collects it.

In a preferred embodiment, the panels 210 include an integrated series of stainless steel tubes, referred to as intermediate tubes, passing through them.

Figure 3:
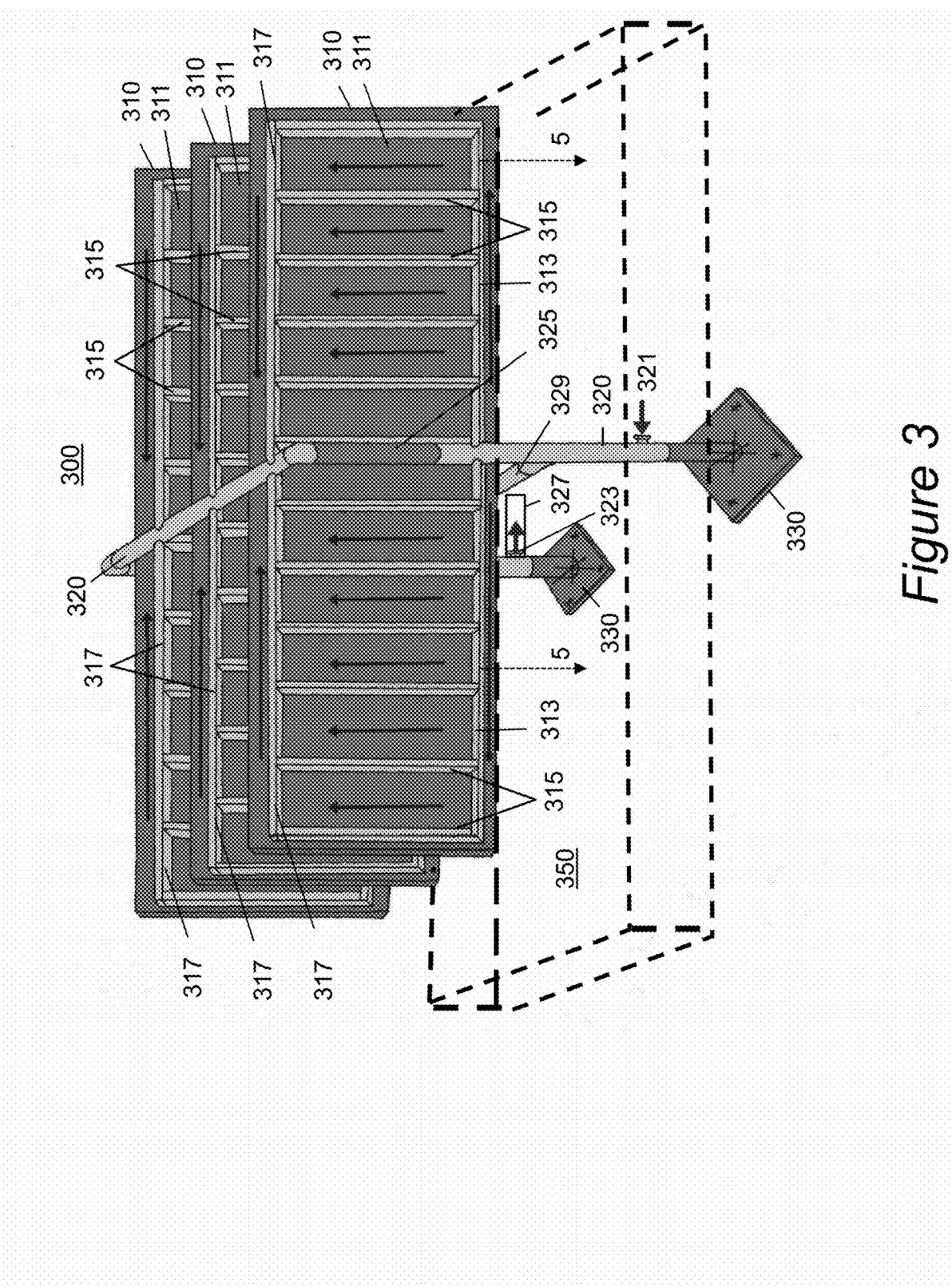
FIG. 3 is a diagram of another embodiment of a condenser section of the present invention.

FIG. 3 is another preferred embodiment of the condenser shown as condenser structure 300, which may be used in place of condenser 200. It may be mounted to a base with mounting supports 330. This embodiment has several panels 310 behind each other with respect to the direction of air flow. Low temperature coolant enters the distribution piping 320 at inlet 321.

This embodiment also includes an integrated series of stainless steel tubes referred to as intermediate pipes 315 that abut the water harvest collection surfaces 311. Coolant enters distribution pipes 320 at inlet pipe 321 then passes through a lower common pipe 313 and a cross pipe which feeds the other panels 310. The coolant then flows through the lower common pipe 313 then upward through the intermediate pipes 315 to collect in the upper common pipes 317. This cools the water harvest collection surfaces 311 and attendant microclimate below the dew point of the ambient air in the air flowing past the condenser structure 300. Distribution pipes 320 have a discontinuity 325 which prevents the coolant from bypassing panel 310.

Cooling the water harvester collection surfaces 311 and microclimate causes the humid air in the air stream passing the surface of the thin sheet to cool as well, thereby condensing the moisture therein. As the moisture carrying capacity of the air volume is exceeded, water condenses both on the water harvest collection surfaces 311 and within the microclimate volume and drops into an optional collection basin 350 resulting in potable water.

It is preferred that the conduits carrying coolant and the panels are not exactly horizontal, but slightly inclined. This allows condensation to run to a common lowest point and drip into a collection basin.

2) Desalination System

The current system may also be embodied as one that efficiently desalinates salt water, including brackish water, hypersaline hydraulic fracturing water used in "fracking", hypersaline product waters resulting from oil and gas production, and seawater.

The design of the system to treat salt water is twofold: 1) the first portion of the method is to create a precisely designed environment, causing a large amount of water vapor to be evaporated into a volume of air, and, 2) creating an environment and condensation chamber conducive to rapid condensation of the evaporated moisture from the atmosphere.

Figure 4:
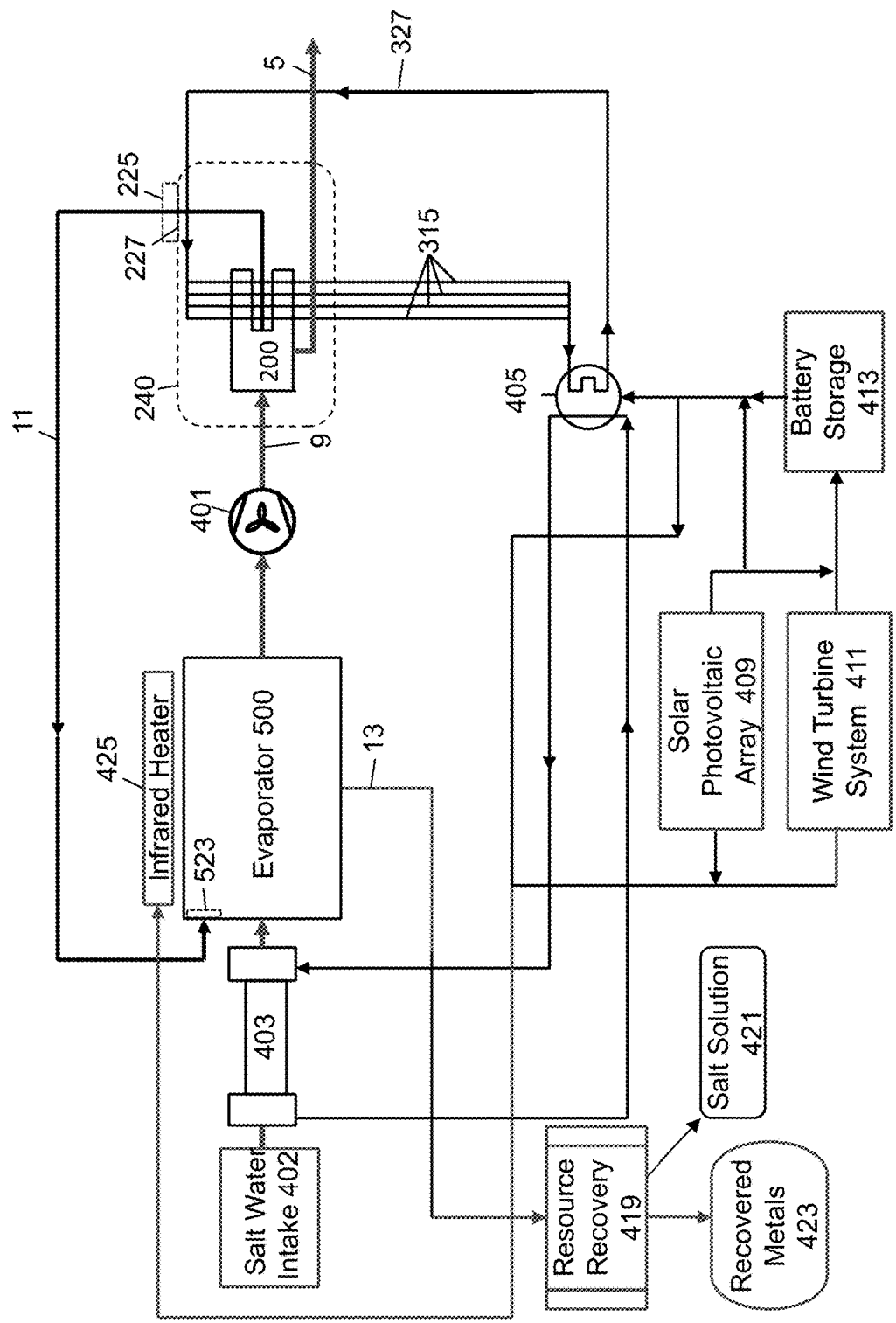
FIG. 4 is an overall block diagram of one embodiment of a salt water purification system according to the present invention.

FIG. 4 shows an embodiment of a desalination system. Salt water, such as seawater, is received at a salt water intake 402. The salt water received is passed through a heat exchanger 403 coupled to a coolant device 405. The cold seawater extracts heat from a hot side of a coolant device 405. The coolant device 405 may be a refrigeration unit or a heat pump. These typically pump heat out of one area and release it to another area. In this case, the coolant device 405 is pumping heat out of the coolant running through the condenser 200. The heat is then passed through the heat exchanger 403 to preheat the salt water entering the evaporator 500. While the additional heat allows for faster evaporation of the salt water, it is optional and not necessary for the operation of the system. Typically, the evaporator 500 is heated by the sun; however, an infrared heater 425, or other type of heater may be used at night, or when the sky is overcast. Moisture depleted dry air 11 also enters the evaporator 500. The moisture depleted dry air 11 receives water vapor as it evaporates to result in moist air 9.

The evaporator 500 also releases the salt water concentrate 13 which is what remains after much of the water is removed. This salt water concentrate may have dissolved minerals, and heavy metals. These may be gold, silver, lithium, Rare Earth metals and other valuable substances. A resource recovery device 419 receives the salt water concentrate and processes it to increase the concentration of the brine and allow concentration of dissolved metals to low grade ore levels for the recovery of metals. This process is used to extract and recover metals 423 and other substances. What remains is salt solution 421 which is returned to the water source or is processed for industrial or commercial uses.

The moist air 9 is then brought into proximity of the condenser 200 or 300 as indicated in FIG. 1 above and performs the same functions to result in potable water 5 being produced.

The coolant device 405 functions in much of the same manner as coolant device 105 of FIG. 1.

The coolant device 405 is optionally powered by solar photovoltaic device 409, wind turbine 411 and battery storage 413, similar to elements of the same names in FIG. 1.

Figure 5:
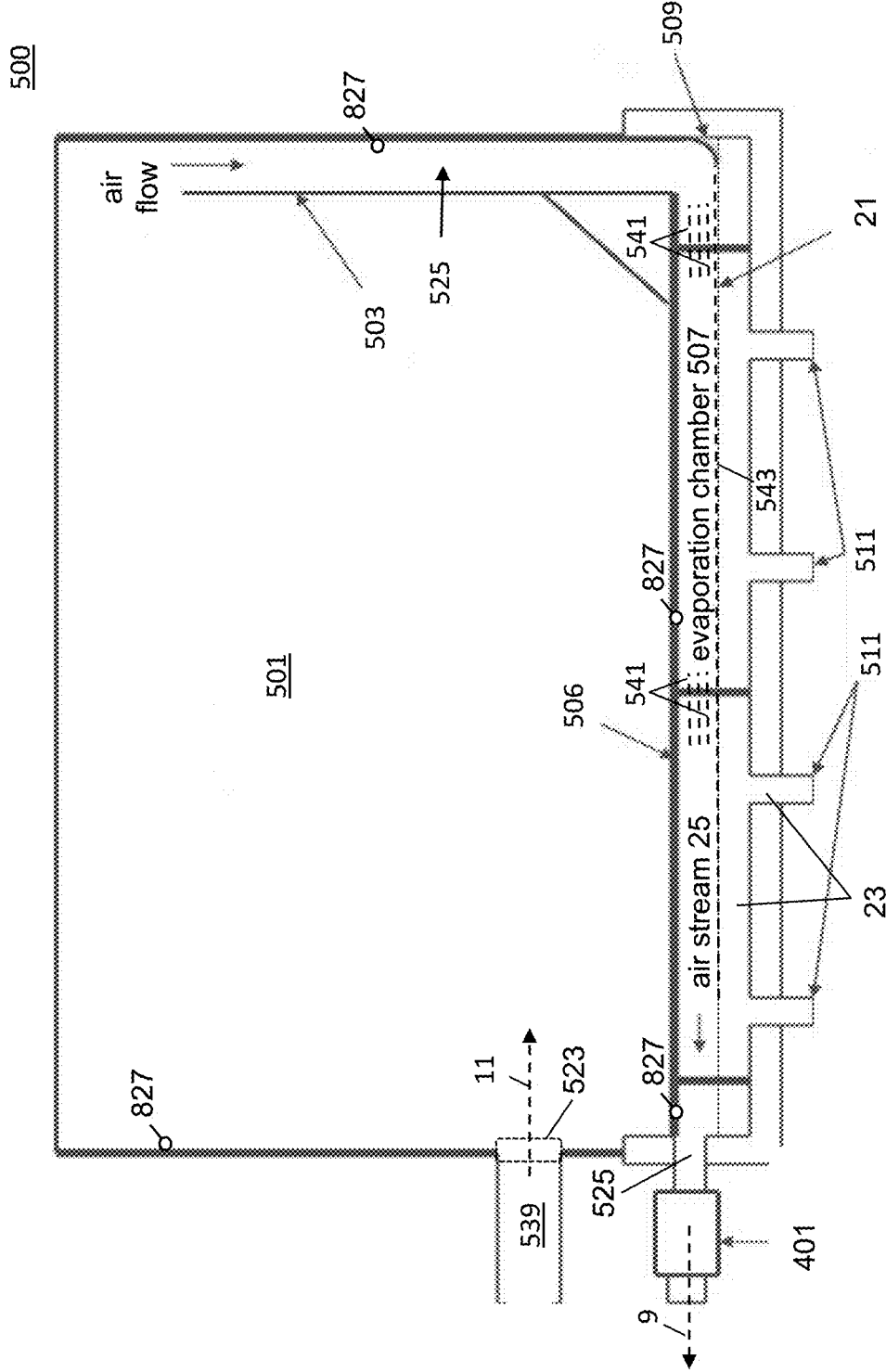
FIG. 5 is a side elevational diagram of one embodiment of an evaporator section according to the present invention.
Figure 6:
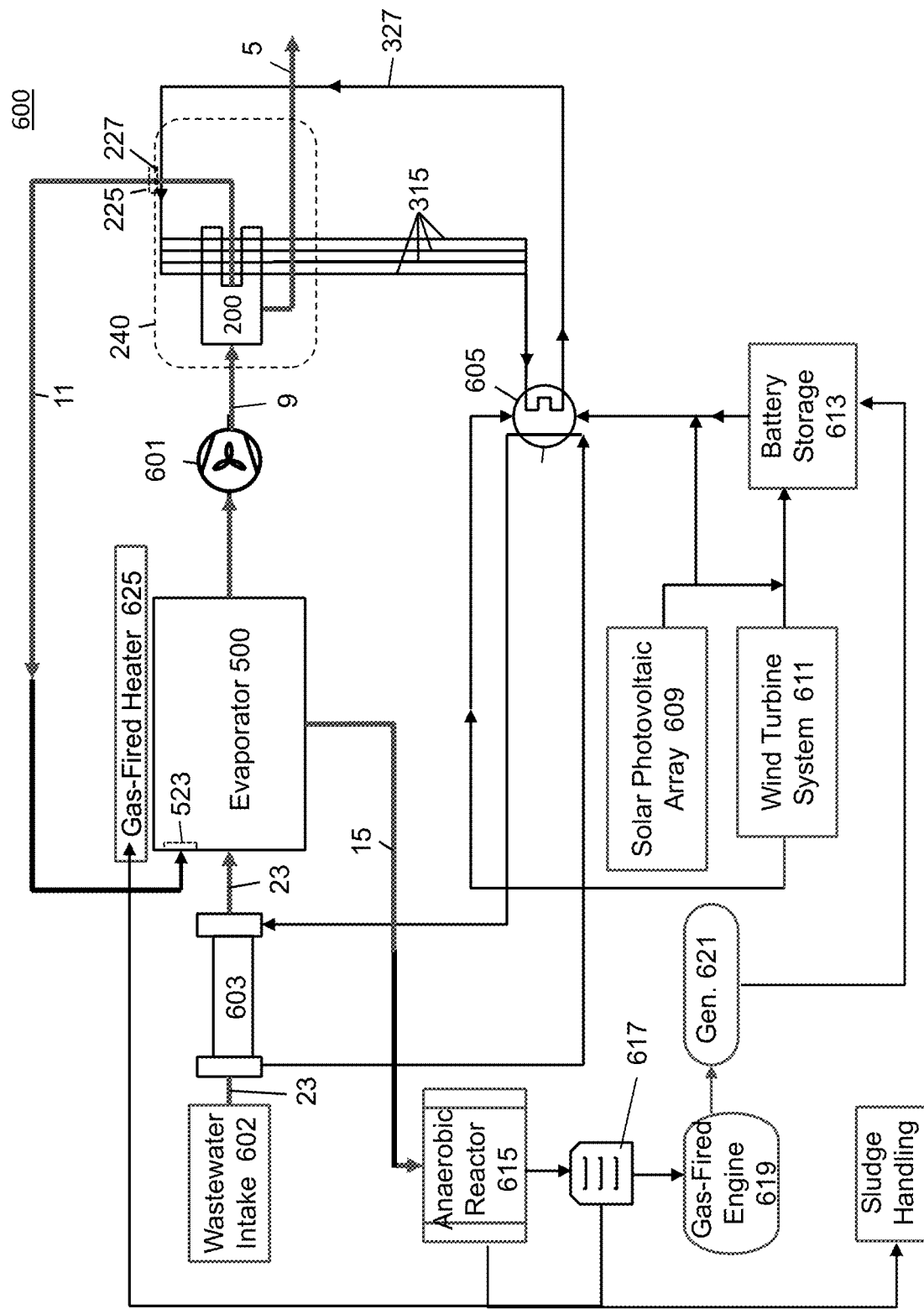
FIG. 6 is an overall block diagram of one embodiment of a wastewater purification system according to the present invention.
Figure 7:
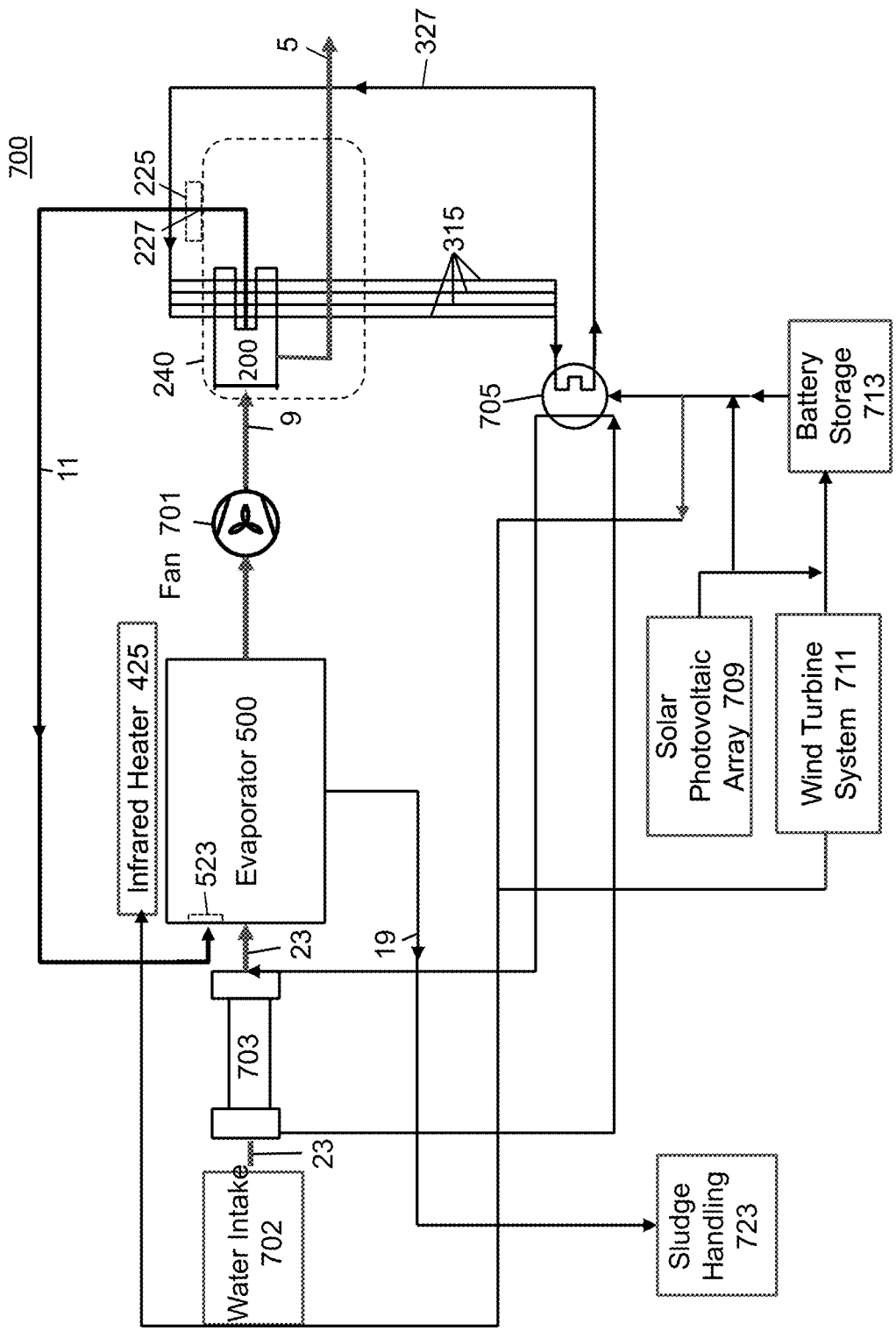
FIG. 7 is an overall block diagram of one embodiment of a river water purification system according to the present invention.

FIG. 5 is a side elevational diagram of one embodiment of an evaporator 500 of FIGS. 4, 6, and 7 according to the present invention. Please note that going forward, salt water, sewage water, polluted water, water contaminated with chemicals, and other non-potable water may be collectively referred to as "non-potable water".

The evaporator 500 is designed to evaporate the largest amount of into the air without suspending non-potable water 23 droplets in the air stream 25. Since this system is optimized to create large amounts of potable water, it must use a high air flow rate that does not kick up water droplets.

Moisture depleted dry air 11 enters a heating chamber 501 from a return air distribution plenum 539. The heating chamber 501 may be a greenhouse-like structure or other structure designed to collect the energy from the sun. An air baffle 503 arranged vertically creates an air flow channel 525 which is separated from the air heating chamber 501 by the air baffle 503.

A straightening plenum 509 is positioned at the end of the air flow channel 525 to redirect the downward air stream to a horizontal air stream 25.

A separation deck 506 is a horizontal separator which creates a top of an evaporation chamber 507. The water surface 21 in the evaporation chamber 507 creates the floor. The evaporation chamber 507 is designed to allow an air stream with a significant amount of volumetric flow to pass between the separation deck 506 and the water surface 21 of non-potable water 23 with little or no turbulence. It is intended to have laminar airflow. The air flow along the surface of the non-potable water 23 in the evaporation chamber 507 allows a substantial amount of water molecules to be released from the surface and jump into the vapor phase. As indicated above, the width, length and shape are designed to have substantial laminar air stream. The laminar air flow reduces the amount of non-potable water 23 being swept up by the air stream as suspended water droplets, reducing the potential for contamination for the purified water. The closed evaporation chamber 507 creates a micro climate of high humidity which is highest at the air water boundary. This boundary layer air absorbs moisture to have a high relative humidity. Once the relative humidity is high, the air absorbs little additional moisture. Therefore, this boundary layer must be constantly replaced.

There are water inlets 511 underneath the water in the evaporation chamber 507. The non-potable water 23 enters here to replace the water that has evaporated.

A fan 401 draws the moist air 9 out of the evaporator 500, thereby causing a slight reduction of the air pressure. If the air flow valve 523 is partially closed, the air pressure is further reduced. Reduced air pressure facilitates evaporation of water into the flowing air.

In an alternative embodiment of the described system, the evaporation chamber 507 includes elongated vanes 541 along the air stream direction which facilitate laminar air stream. The vanes 541 run parallel to the length of the evaporation chamber 507 which minimize turbulence and increase laminar flow of the air stream 25 along the length of the vanes 541. These vanes may run for any length of the evaporator chamber 507.

In order to minimize the number of liquid droplets from becoming swept up into the air stream 25 and becoming entrained in the airstream and contaminating the air stream 25, a barrier is to be used. This barrier may be a screen 543 as shown in FIG. 5. Water droplets get caught in the screen and accumulate. When enough accumulate, they drop back into the non-potable water 23 in the bottom of the evaporation chamber 507. This screen 543 may run only the length of a portion which exhibits substantial turbulence or increased air flow velocity, or it may extend the entire length of the evaporation chamber 507.

There may be sensors 827 throughout the evaporator 500 which measure any physical parameter, such as temperature, relative humidity, air velocity, air turbulence, etc. These can be monitored by a control unit (825 of FIG. 8) which then makes decisions based upon the input received, makes decisions and actuated elements of the system to optimize the operation of the system.

In an alternative embodiment of the described system, the evaporation chamber 507 includes a narrowed portion followed by an enlarged portion, thereby causing an area of reduced air pressure, allowing for greater evaporation into the airstream.

3) Water Purification System

Another embodiment of the system described in this application purifies contaminated water. This contaminated water may be hydraulic fracturing brines or product water which include other chemical contaminants besides the dissolved salts, abandoned mine water discharges, industrial wastewater, municipal wastewater, waters containing pharmaceuticals, fertilizers, or other chemicals, and water containing microorganisms, such as giardia and cryptosporidium spores.

Referring now to FIG. 6, an alternative embodiment of the present invention comprises a wastewater system 600 capable of producing fresh water from wastewater such as having sewage with human waste. The elements function similarly to their counterparts in the desalination system 400 of FIG. 4. Wastewater is received at the wastewater intake 602 and is preheated by heat exchanger 603. A fan 601 draws moist air 9 from the evaporator 500 and passes it over a condenser 200 causing potable water 5 to be collected. Condenser 200 is cooled by a coolant cooled by a coolant device 605. The evaporator 500 receives wastewater with dissolved organic material. The dissolved organic material of the wastewater may be referred to as biochemical oxygen demand (BOD) material. In this embodiment, special material handling equipment should be used to extract solid materials and concentrated BOD material, referred to as concentrated wastewater 15 from the wastewater before it is evaporated. The concentrated wastewater 15 is provided to an anaerobic reactor 615. This will be used to create methane and other combustible gases. The water vapor in the collected gases is removed by a gas dryer 617 using conventional equipment and methods. The dried gas is now available to be used as fuel for a gas-fired engine 619. The gas-fired engine 619 drives a generator 621 to create electric power that is provided to battery storage 613.

In an alternative embodiment, the power is provided directly to the coolant device 605 and to any other piece of equipment requiring electric power, such as pumps and fans.

The gas from the gas dryer 617 is also provided to a gas-fired heater 625. This heats the air in the evaporator 500 that is used to absorb the water vapor.

FIG. 7 discloses a water purification system 700 for non-potable water other than salt water. This may include natural bodies of water such as lakes, streams and ponds. Non-potable water 23 is received at the water intake 702 and is preheated by heat exchanger 703. A fan 701 draws moist air 9 from the evaporator 500 and passes it over a condenser 200 causing potable water 5 to be collected. Condenser 200 is cooled by a coolant cooled by a coolant device 605. This functions the same as the salt water system 400 of FIG. 4, except that it does not include the elements for resource recovery 419 and an element to hold the recovered metals 423 since this water typically has little valuable metals to recover. It also does not include an element to collect the salt solution 421. These elements are replaced by a sludge handling element 723. This takes the sludge from the evaporator 500 and disposes it.

Figure 8:
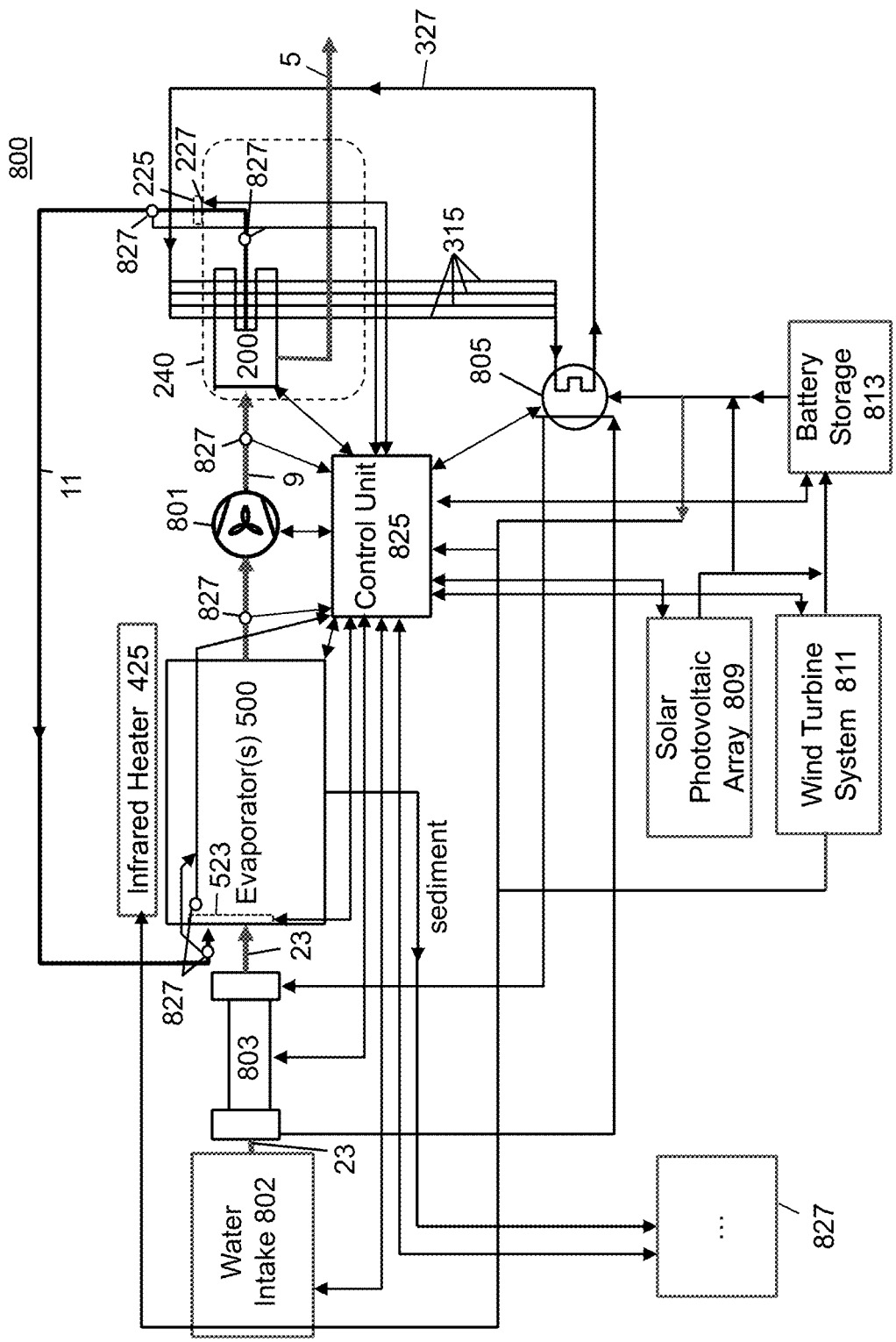
FIG. 8 shows an alternative embodiment of the system which may be implemented into the systems of FIGS. 4, 6 and 7.

FIG. 8 shows an alternative embodiment of the system which may be implemented into the systems of FIGS. 4, 6 and 7. Block 827 represents elements of these previous figures that are not shown in FIG. 8.

Wastewater is received at the water intake 802 and is preheated by heat exchanger 803. A fan 801 draws moist air 9 from the evaporator 500 and passes it over a condenser 200 causing potable water 5 to be collected. Condenser 200 is cooled by a coolant cooled by a coolant device 805.

In this embodiment, a plurality of sensors 827 are located within the air stream to measure at least one of air temperature, air humidity, air flow rate, turbulence and other physical parameters. These sensors 827 may be located in or after the evaporator, in or after the condenser 200 or on either side of the air flow valves 225 and 523. These connect to the control unit 825. Control unit 825 reads all necessary input from the sensors and makes determinations on how the system is running and what adjustments must be made to achieve the desired results.

Control unit 825 is connected to fan 801 and can read its current status. This may include the current it is receiving, its speed, the load, its past operation parameters values over time which can be paired with other information pertaining to the same time. The control unit can start, stop, adjust the speed and otherwise operate the fan.

Control unit 825 is connected to a coolant device 805. It can read any pertinent information from the coolant device 805 and also record this information along with its time of acquisition. The control unit can start, stop, adjust the speed, output and otherwise operate the coolant device 805. Control unit 825 is connected to all elements of the system and monitors them as well as actuates them to optimize the system.

In an alternative embodiment based upon FIG. 8, there may be more than one fan, located at the inlet and/or outlet of the evaporator 500, or the vessel 240 or anywhere within the evaporator 500, the vessel 240 or other conduits of the system. Each fan may be interactively and independently controlled by the control unit 825 to adjust the air flow rate entering the evaporator 500/vessel 240, exiting the evaporator 500/vessel 240 and any airflow within the evaporator 500/vessel 240. The varying air flow velocities can adjust local air pressures and be used to optimize the operation of the evaporator 500/vessel 240.

Also, the air flow valves 523 of the evaporator 500 and 225 of the vessel 240 may be interactively and independently controlled by the control unit 825 in combination with the fans to adjust the air flow and pressures in various parts of the system to optimize its operation. In an additional embodiment, there may also be an air flow valve on an outlet of the evaporator(s) 500 and on an inlet of the vessel(s) 240. These may also be independently and interactively controlled by the control unit 825 along with other air flow control devices and fans to optimize the system.

Figure 9:
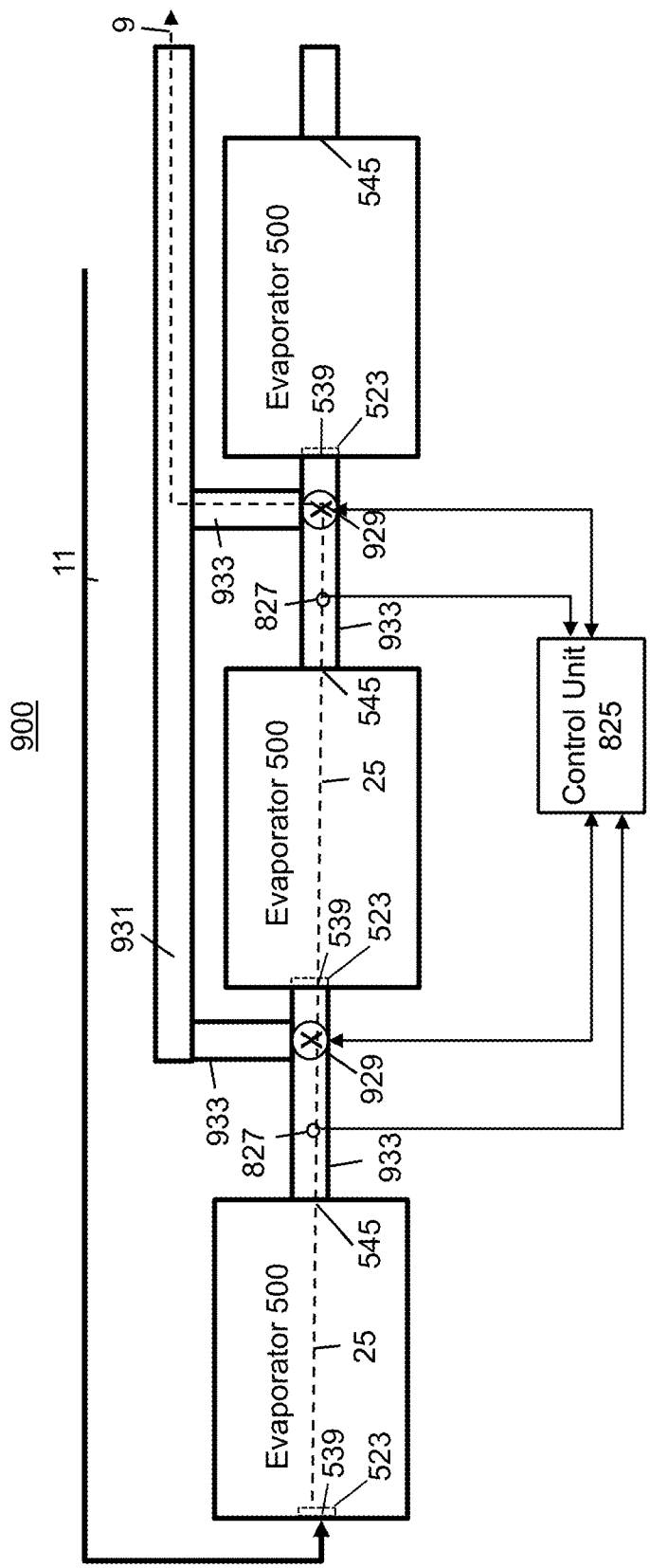
FIG. 9 shows an alternative embodiment of a portion of the system relating to the evaporator which may be merged into the systems of FIGS. 4, 6, 7 and 8.

FIG. 9 shows an alternative embodiment of a portion of the system relating to the evaporator which may be merged into the systems of FIGS. 4, 6, 7 and 8. This evaporator section 900 can be used to replace the evaporator 500 of the previously described embodiments.

Depending upon the air flow rate, and the efficiency and size of the condensers, it may be more efficient to employ several evaporators 500. These evaporators 500 are connected here with connection conduits 933 which allow air flow to pass from an air flow outlet 525 of one evaporator 500 to a bypass valve 929. The bypass valve 929 may direct the air flow into an inlet of another evaporator 500 or to a bypass conduit, bypassing the remaining evaporators 500. There are sensors 827 which measure physical parameters such as temperature, relative humidity or other physical parameters. In this embodiment, they are at least measuring relative humidity. The output of the sensors 827 is provided to the control unit 825. The control unit 825 can then make determinations regarding the evaporators 500. For example, if the humidity sensed by sensor 827 after the first evaporator is 70% relative humidity, it is determined that the humidity should be increased. Therefore, the control unit 825 will leave bypass valve 929 open allowing the air stream to pass to the second evaporator 500. A sensor 827 after the second evaporator 500, determines that the relative humidity is at 95% and determines that passing it through another evaporator will use more energy but will not produce significant additional amount of potable water. Therefore, control unit 825 decides to operate the bypass valve 929 between the second and third evaporators 500 causing the air stream to be redirected through a connection conduit 933. The air stream then bypasses the last evaporator 500 since no further evaporation is required for this air stream.

Figure 10:
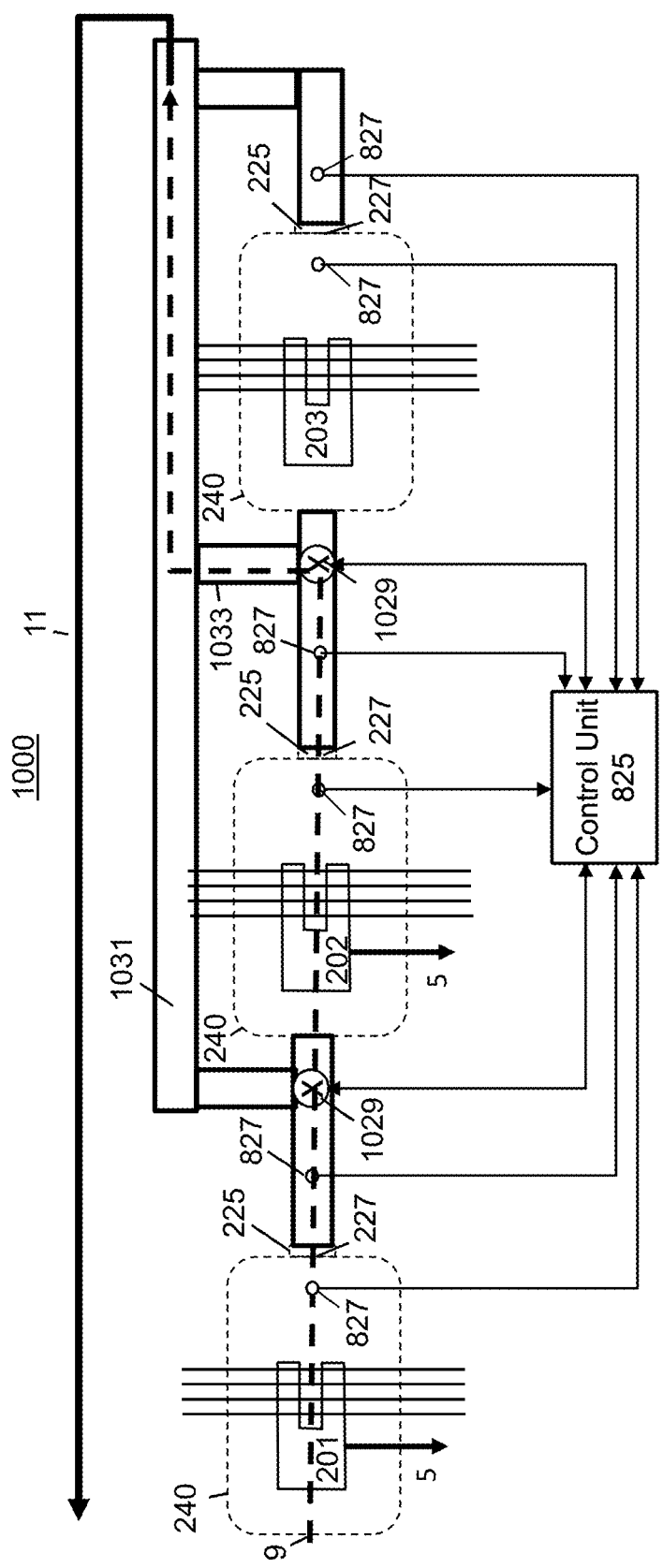
FIG. 10 shows an alternative embodiment of a portion of the system relating to the evaporator which may be merged into the systems of FIGS. 4, 6, 7 and 8.

FIG. 10 shows an alternative embodiment of a portion of the system relating to the condenser which may be merged into the systems of FIGS. 4, 6, 7, 8 and 9.

Depending upon the air flow rate, and the efficiency and size of the evaporator 500, it may be more efficient to employ several condensers 201, 202, 203. These condensers 201, 202, 203 have sensors 827 associated with them that provide information to the control unit 825. The control unit 825 can then make determinations regarding the condensers 201, 202, 203. For example, if the humidity sensed by sensor 827 after the first condenser 201 is not below a predetermined humidity level, it is determined that the humidity should be decreased and pass through a next condenser 202. Therefore, the control unit 825 will leave the first bypass valve 1029 open allowing the air stream to pass to the second condenser 202. A sensor 827 after the second condenser 202 then determines that the relative humidity is below the predetermined humidity level. If it is decided that passing the air stream through another condenser 203 does not add much benefit, then control unit 825 operates the bypass valve 1029 between the second condenser 202 and the third condenser 203 causing the air stream to be redirected through a connection conduit 1033. The air stream then bypasses the last condenser 200 since no further condensation is required for this air stream. In this manner, the control unit can adjust various parameters of the system, such as adjusting air flow rate. It can adjust the number of evaporators that the air stream will pass through, the number of condensers it will pass through, the temperature of the coolant, the pressure in the evaporator 500 and the pressure surrounding the condensers 201, 202, 203. By adjusting these parameters, the system can optimize the collection of moisture from the atmosphere, the amount of potable water purified from salt water, waste water or other contaminated water.

Figure 11:
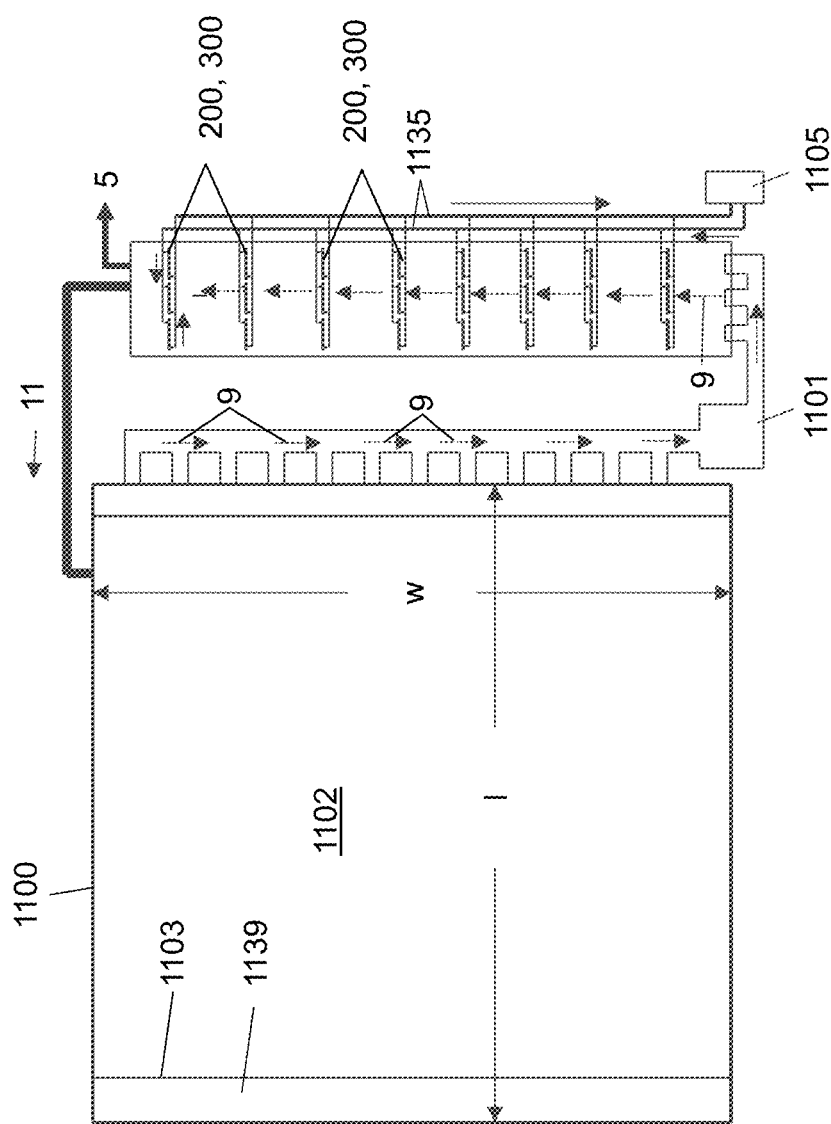
FIG. 11 shows a schematic plan view of an embodiment of the system according to the present invention employing the multiple condensers.
Figure 12:
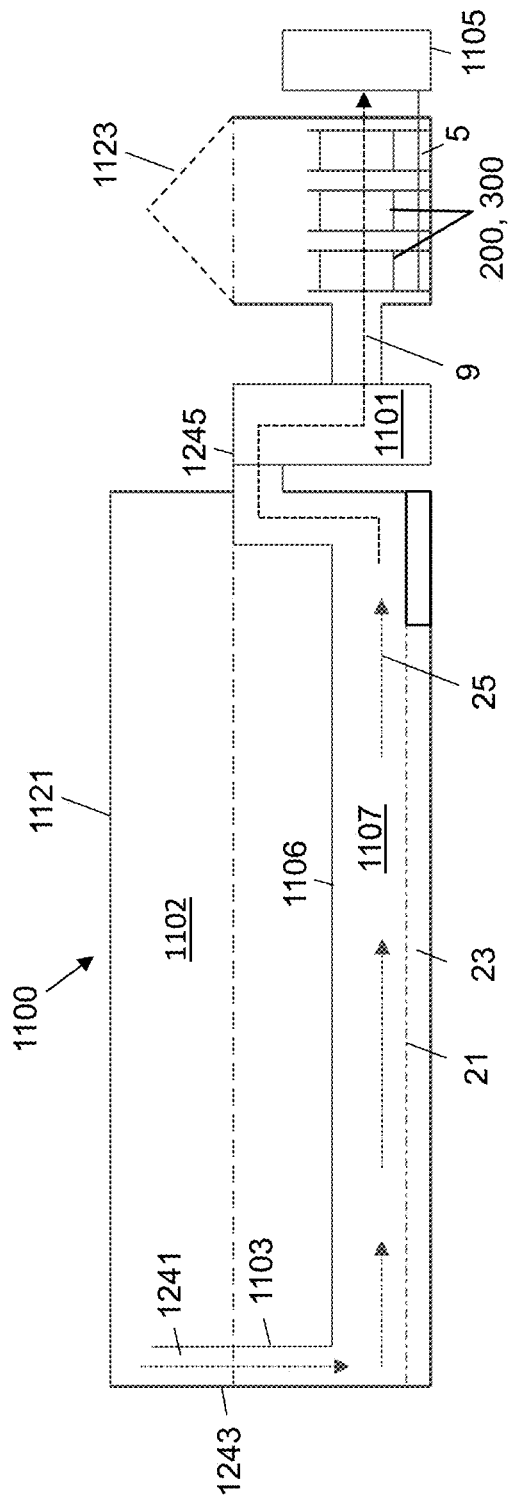
FIG. 12 shows a schematic elevational view of an embodiment of FIG. 11.

FIG. 11 shows a schematic plan view of an embodiment of the system according to the present invention employing the multiple condensers 200. FIG. 12 shows a schematic elevational view of an embodiment of FIG. 11. This embodiment will be described with respect to FIGS. 11 and 12. In this embodiment, an evaporator 1100, similar to that of FIG. 5, receives incoming air into a heating chamber 1102 which may be an area enclosed by a greenhouse-like structure 1121. Heating chamber 1102 may also be a chamber heated by solar light focused by lenses or by mirrors reflecting light or be heated by heat transfer fluids heated by a thermal heliostat. The air inside this heating chamber 1102 is heated and is then drawn as an air stream 25 downward into a passageway 1241 between an outer wall 1243 of the evaporator 1100 and a baffle 1103 by a fan 1101. The air stream 25 then passes over the surface 21 of non-potable water 23 causing evaporation of water vapor into the air stream 25 to create moist air 9.

Air stream 25 then passes through a separating convolution 1245 which causes droplets to hit the walls of the separating convolution 1245 and drop the water droplets of non-potable water which are swept into the air stream 25 as it passes over the non-potable water 23.

The resulting air is now moist air 9 carrying a significant amount of water vapor. This moist air 9 is then passed over a plurality of condensers each similar to condensers 200 and 300 of FIG. 3. Each of these condensers 200, 300 is cooled with a coolant 1135.

A coolant device 1105 receives and cools the coolant 1135 and passes this coolant 1135 through the condensers 200, 300. The coolant 1135 should be of a temperature which is below the dew point of the moist air 9. As the air passes over the condensers 200, 300, the water vapor in the air condenses and is collected as potable water 5. The condensers 200, 300 may be housed within a greenhouse-like structure 1123.

For clarity, sensors for temperature, pressure, humidity, air velocity and other physical parameters, a connected control unit and connections between the sensors, control unit and other elements including the fan 1101 and coolant device 1105 are not shown here for clarity but exist in at least one of these embodiments. Also, the solar voltaic array, wind turbines and battery storage are not shown in this figure but are assumed to be in the functional embodiment.

Figure 13:
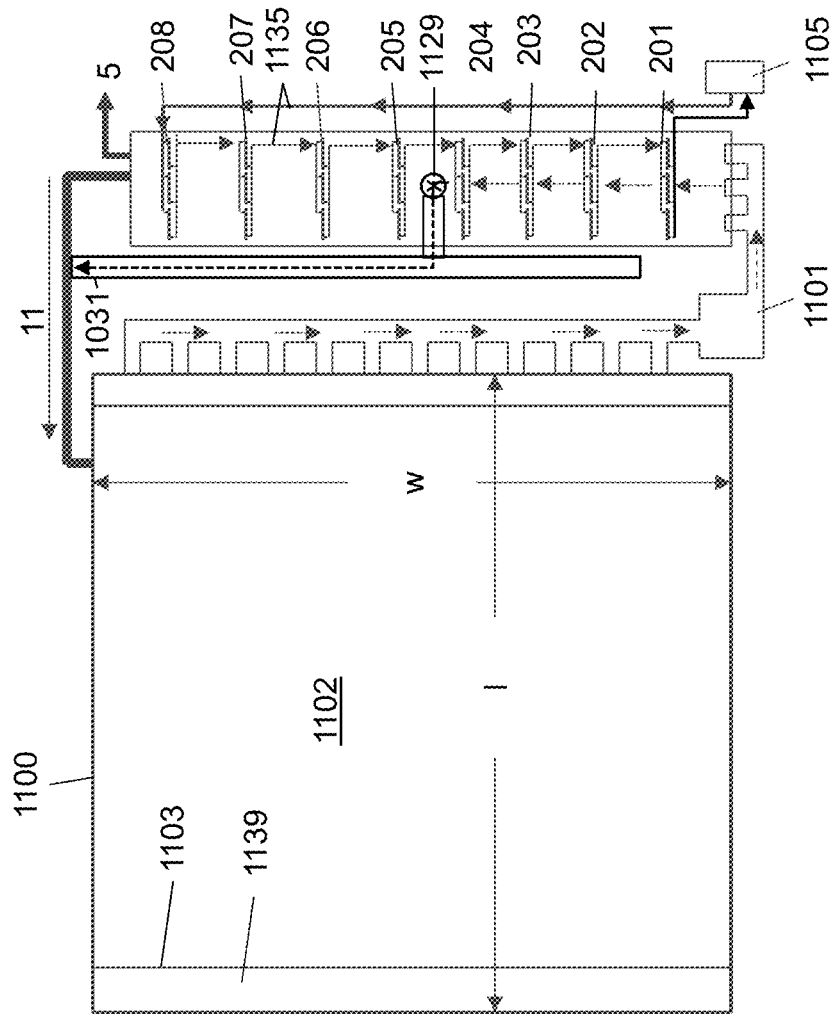
FIG. 13 shows a schematic plan view of an embodiment of the system according to the present invention employing the multiple condensers of FIG. 10.

FIG. 13 shows a schematic plan view of an embodiment of the system according to the present invention employing the multiple condensers of FIG. 10. In this embodiment, the evaporator 1100 and the fan 1101 function in the same manner as described in connection with FIGS. 11 and 12. However, this embodiment passes the moist air 9 by the condensers until the humidity level drops to a predetermined level then is directed by a bypass valve 1029 to a bypass conduit, bypassing the remaining condensers. This reduces the amount of air pressure drop and reduces the fan horsepower required.

FIG. 13 shows condensers 201, 202, 203, 204, 205, 206, 207 and 208 having their coolant lines. The coolant from coolant device 1105 separately passes through a header (not shown) connected to condenser 208, a header (not shown) connected to condenser 207, a header (not shown) connected to condenser 206, a header (not shown) connected to condenser 205, a header (not shown) connected to condenser 204, a header (not shown) connected to condenser 203, a header (not shown) connected to condenser 202, and a header (not shown) connected to condenser 201 and then back to the coolant device 1105. It is to be understood that a separate header is also used to collect the flow from each condenser.

It is to be understood that in another embodiment, the coldest condenser is condenser 208 and the warmest one is condenser 201 with the others having successively warmer temperatures moving from condenser 208 to condenser 201. Temperature sensors measure the coolant temperature as well as the air temperature between the condensers which is sent to a control unit. The control unit operates the elements of the systems and for example, would cause the coolant unit to reduce the coolant temperature so that the coolant at each condenser is below the dew point of the surrounding air stream.

The moist air 9 enters and passes by condenser 201, then 202, then 203 . . . then through 208. The moist air 9 loses moisture and cools as it moves past condenser 201, 202 . . . then 208. This then is a countercurrent thermal arrangement which maximizes condensation.

Driving airflow past the condensers requires power. At times, the amount of vapor that can be extracted does not warrant the energy required to extract it. Therefore, in this embodiment, there are humidity (and other) sensors between the condensers. When the humidity drops below a certain predetermined level, a bypass valve, such as that shown in FIG. 10 may be activated to cause the air stream 25 to be directed into a bypass conduit 1031 and bypass at least one of the condensers.

Method

Figure 14:
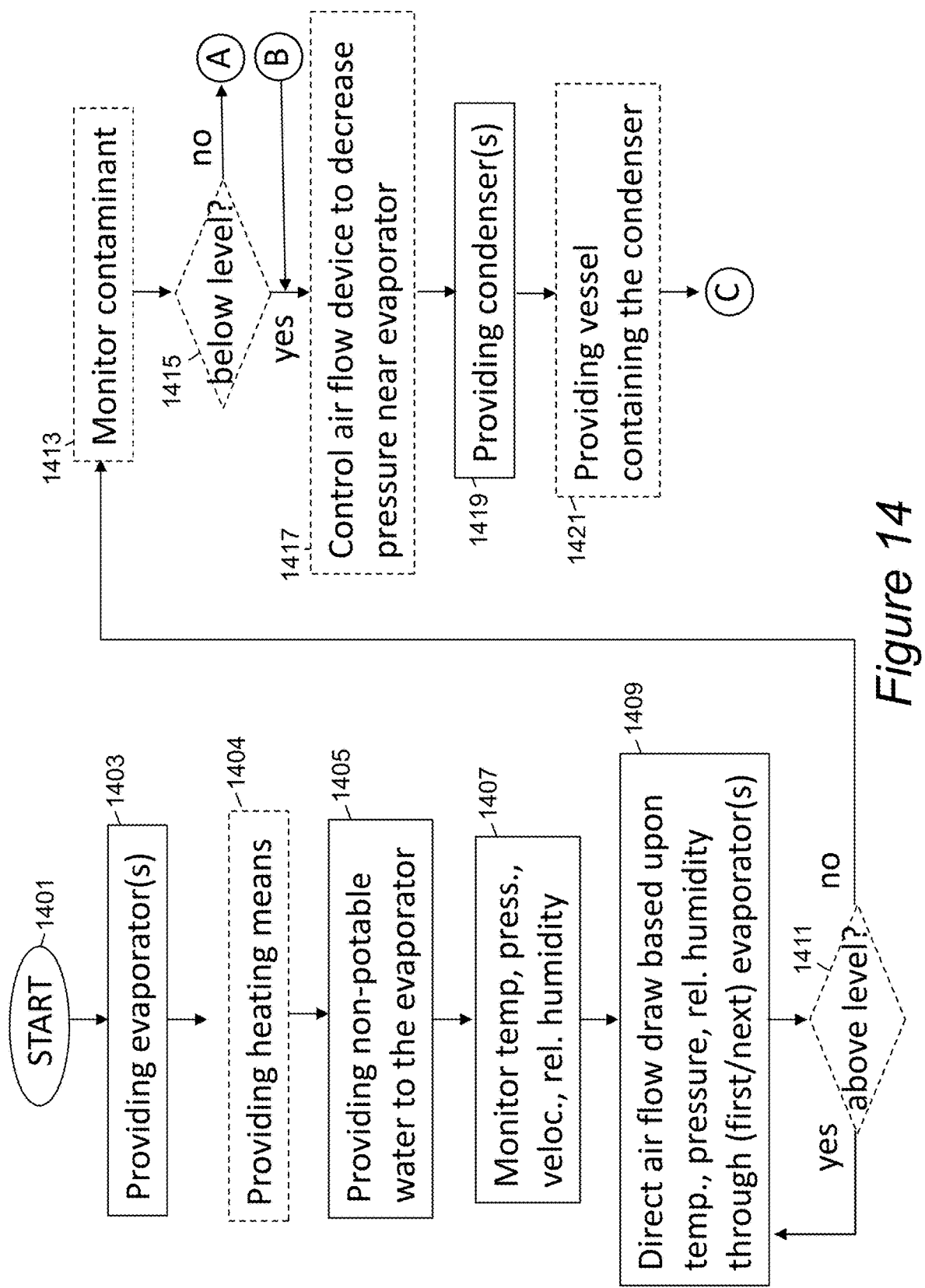
FIGS. 14, 15 and 16 together illustrate a flowchart illustrating the functioning of an embodiment of the current invention.
Figure 15:
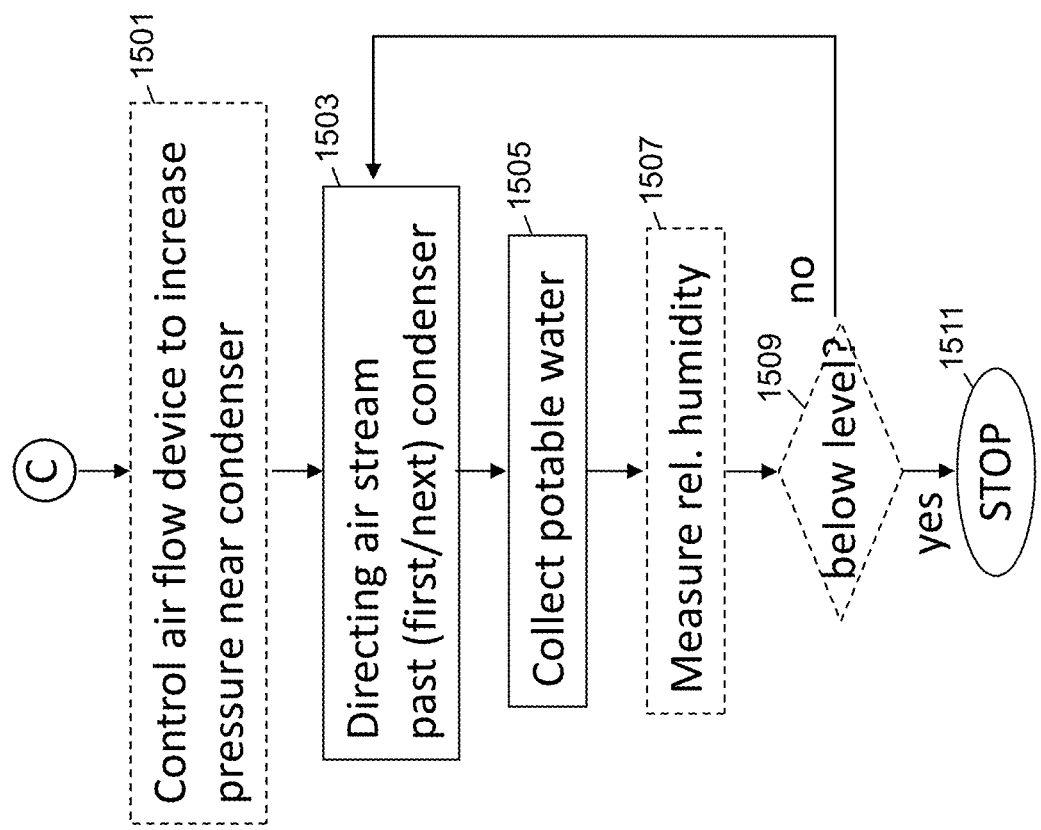
Figure 16:
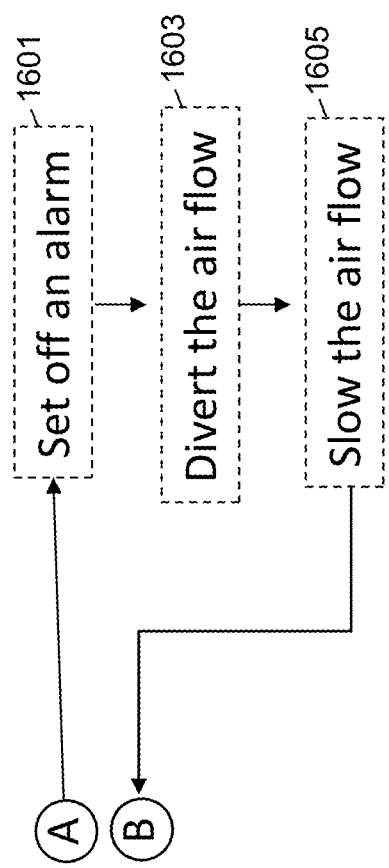

FIGS. 14, 15 and 16 together are a flowchart illustrating the functioning of an embodiment of the current invention being a method of efficiently creating potable water from non-potable water. The process starts at 1401. In step 1403 one or more evaporators are provided. One evaporator would be similar to the embodiment of FIGS. 4, 6 and 7, and multiple evaporators would be similar to the embodiment of FIG. 9.

These evaporators have a larger surface area than depth to maximize the surface area to mass ratio, as illustrated in FIG. 11. They also have an air flow passageway from the heating chamber through the evaporation chamber and out an air flow exit, as shown in FIGS. 5 and 12. Optionally, as indicated later, additional heating device and additional heating may be provided to the heating chamber 501 of the evaporators 500, to increase evaporation of non-potable water 23.

In step 1405, the non-potable water is provided to the evaporation chamber from below. In step 1407, a physical parameter of at least one of the heating chamber, the evaporation chamber and the air flow exit are monitored by appropriate sensors. These physical parameters may be temperature, air pressure, relative humidity and air stream velocity.

In step 1409, the control unit controls the air flow device, which may be a fan or blower that is positioned at or near the air flow exit. The control device reads the monitored temperatures, pressures, relative humidity and air steam velocity and creates an air stream having a velocity causing it to reduce the air pressure in the evaporator drawing an air stream from the heating chamber through the evaporation chamber and out of the air flow exit evaporating water vapor into the air stream. The air flow device also directs the air stream from the air flow exit past condensers. The condensers have at least one surface held at a temperature below the dew point of the air stream. The control unit calculates the dew point based upon the air stream temperature and relative humidity.

In the embodiments having multiple evaporators, in step 1411, the relative humidity exiting a condenser is monitored. If it is less than a predetermined relative humidity, the air stream is routed through another evaporator. The process is repeated either until the relative humidity exceeds the predetermined level, or there are no additional evaporators to further process the air stream.

In still another embodiment, the air stream exiting the evaporator does not exceed the required water content; the control unit may slow the air flow rate or activate additional heaters which heat the air stream.

In step 1413, a contaminant sensor is provided in the air flow exit that can measure at least one contaminant in the air stream and provide the measurements to the control unit. In step 1415, the control unit determines if the amount of contaminants is below a safe acceptable level. If so, the processing continues at step 1417, if not, process continues at "A" of FIG. 16.

If the contaminants are above the acceptable level, in step 1601, optionally, an alarm, notification, or corrective message is provided to a user. Also, optionally, in step 1603, the air stream will be directed to a direction other than to the condenser, stopping the contaminated air stream from condensing into the potable water.

Also, optionally, in step 1605, the control unit can slow the velocity of the air stream, preventing more contaminants from being swept up into the air stream. After step 1605, processing continues at "B" of FIG. 14.

In step 1417 the operation of air flow device may be adjusted to adjust the air pressure in the evaporator. In still another embodiment, there is an air flow valve at the air flow exit of the evaporator. This can be adjusted to also increase or decrease the air pressure within the evaporator. This is under the control of the control unit.

In step 1419, at least one condenser is provided in the air stream. In step 1421, optionally a vessel may be provided which encloses the one or more condensers. This vessel has an air flow inlet and an air flow outlet. It may optionally have an air flow valve on the air flow outlet which may be adjusted by the control unit. Processing continues at "C" of FIG. 15.

Therefore, in step 1501, when the control unit partially closes the air flow valve, the air pressure within the vessel increases, and similarly, when the control unit partially opens the air flow valve, the air pressure in the vessel reduces.

In step 1503 the air stream is directed to the condenser and the potable water is collected in step 1505. If there is an embodiment having more than one condenser, then the humidity is measured in step 1507. In step 1509, if the measured humidity is below a predetermined humidity level, processing ends at step 1511. If the measured humidity is greater than a predetermined level, then the air stream is directed through a next condenser, if one exists. This process continues until either there are no more condensers to use or the measured humidity of the air stream exiting the condenser is below the predetermined level. This architecture causes the moisture to be continually run through condensers to extract water vapor which was not extracted by the previous condensers. This allows for an adjustable amount of condensation capacity to adjust for changes in ambient temperatures.

Please note that the embodiment of FIG. 1 may be varied to employ multiple condensers such as those shown in FIG. 10. In this embodiment, the adjustable condenser capacity will adjust for the differences in the ambient air temperature and relative humidity.

Similarly, the use of multiple evaporators in various embodiments shown allows for the interactive adjustment to adjust to changing sunlight and temperature conditions.

Implementation

The amount of water evaporated from a body of water in contact with circulating air can be calculated with the following equation:

$$E = kA(x_s - x)$$

where:
E=amount of evaporated water (kg/h)
k=(25+19 v)=evaporation coefficient (kg/m²h)
v=velocity of air above the water surface (m/s)
A=water surface area (m²)
$x_s$=humidity ratio in saturated air at the same temperature as the water surface (kg/kg)
x=humidity ratio in the air (kg/kg)

It was therefore determined that by using a 60 m by 60 m evaporator, the water surface area is 3600 sq. meters at a temperature of 140 Degrees F. (60 deg. C.), and an air flow velocity of 3.5 miles per hour (1.56 m./sec.), the saturated humidity ratio xs would be 0.421 kg/kg. The humidity ratio x would be 0.0285 kg/kg. In an air volume of 5400 m3, there would be 14,469,250 kg. of water evaporated each hour. If the air velocity were increased to 5 mph (2.235 m/sec.), this amount of water evaporated would then jump to 17,837,710 kg. each hour.

To detail the effects of air velocity and temperature on units designed to attain a potable water volume of 5.0 million gallons per day (MGD), assuming an evaporator efficiency of 60% and operating at 60 deg. C. and assuming condensers with a 60% water vapor removal efficiency, below is the water removal by stages for a 2-stage and a 3-stage condenser section:

| 2-stage condenser section (at 60° C.) | | |
|---|---|---|
| | Input | Output |
| Stage 1 | 2.16 | 1.29 |
| Stage 2 | 1.29 | 0.78 |
| Total | | 2.07 |
| | | 2,070,000 |

| 3-stage condenser section (at 60° C.) | | |
|---|---|---|
| Stage 1 | 2.16 | 1.29 |
| Stage 2 | 1.29 | 0.78 |
| Stage 3 | 0.78 | 0.47 |
| Total | | 2.54 |
| | | 2,536,804 |

Now assuming an evaporator efficiency of 60% and at 80° C. and assuming condensers with a 60% water vapor removal efficiency, below is the water removal by stages for a 2-stage stage condenser section:

| 2-stage condenser section (at 80° C.) | | |
|---|---|---|
| | Input | Output |
| Stage 1 | 5.24 | 3.14 |
| Stage 2 | 3.14 | 1.89 |
| Total | | 5.03 |
| | | 5,029,233 |

It is apparent that a 2-stage unit operating at 60° C. does not provide enough flow; using two 3-stage units will provide the desired flow. Now to compare this unit to the 2-stage unit operating at 80° C.; while twice the water is produced so that only a single 2-stage unit is required to attain the desired 5 MGD output, the operating air temperature cannot be naturally attained and will need continuous additional energy inputs to attain the higher operating air temperature. If energy costs are the limiting factor in system design, the more efficient and sustainable method to attain the five million gallons per day is to use two 3-stage units operating at 60° C. rather than one 2-stage unit operating at 80° C. However, if the higher energy costs can be absorbed into the cost of the produced water, the lower capital costs of the single 2-stage unit becomes the preferred selection.

Enhanced Temperature Water Harvesting

The enhanced temperature water harvesting system 1700 is designed for atmospheric operation that condenses water directed to the unit from the atmosphere where it later precipitates as it flows through the closed-loop air stream by increasing the evaporation rate of the non-potable waters in excess of the design rate of the water harvesting system 1700 through the use of air temperatures elevated in excess of 140° F. This enhanced temperature will dramatically increase the water carrying capacity of the air. Furthermore, a closed-loop air stream is utilized by the enhanced temperature water harvesting system 1700 to minimize energy needs.

Embodiments of the invention are discussed below with reference to FIGS. 17-19. However, those skilled in the art will readily appreciate that the detailed description given herein with respect to these figures is for explanatory purposes as the invention extends beyond these limited embodiments.

Figure 17:
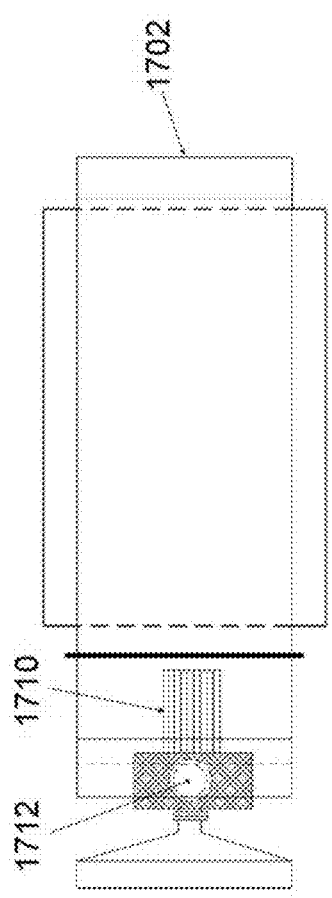
FIG. 17 shows a plan view of one embodiment of an air heating chamber according to the present invention.
Figure 18:
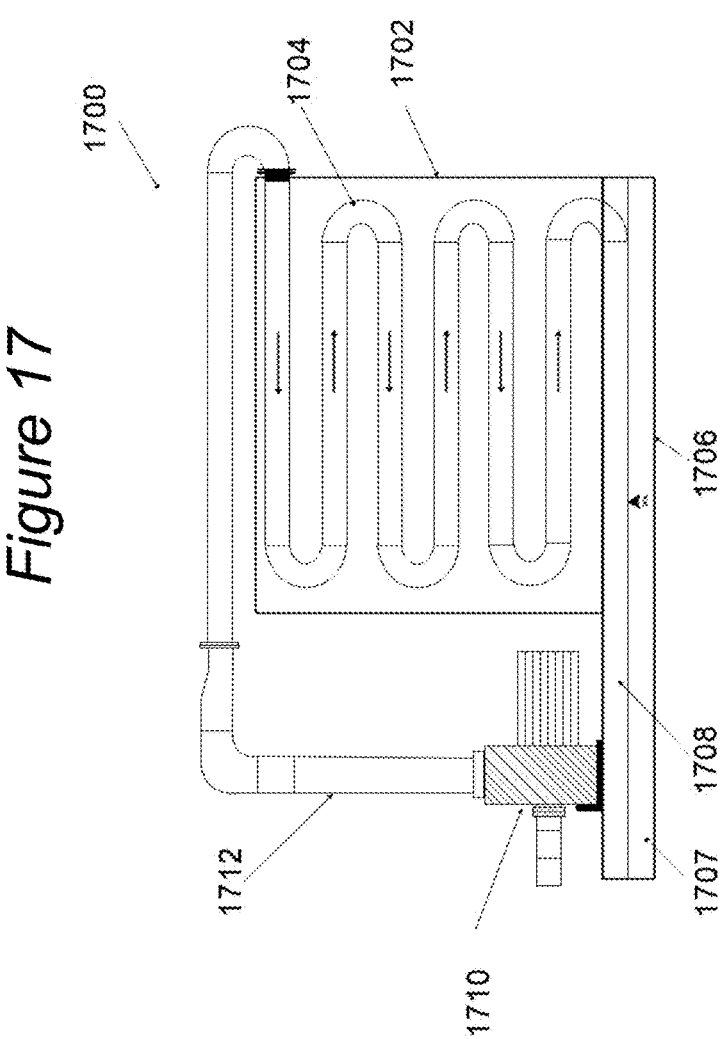
FIG. 18 shows an elevational view the air heating chamber of FIG. 17 according to the present invention.
Figure 19:
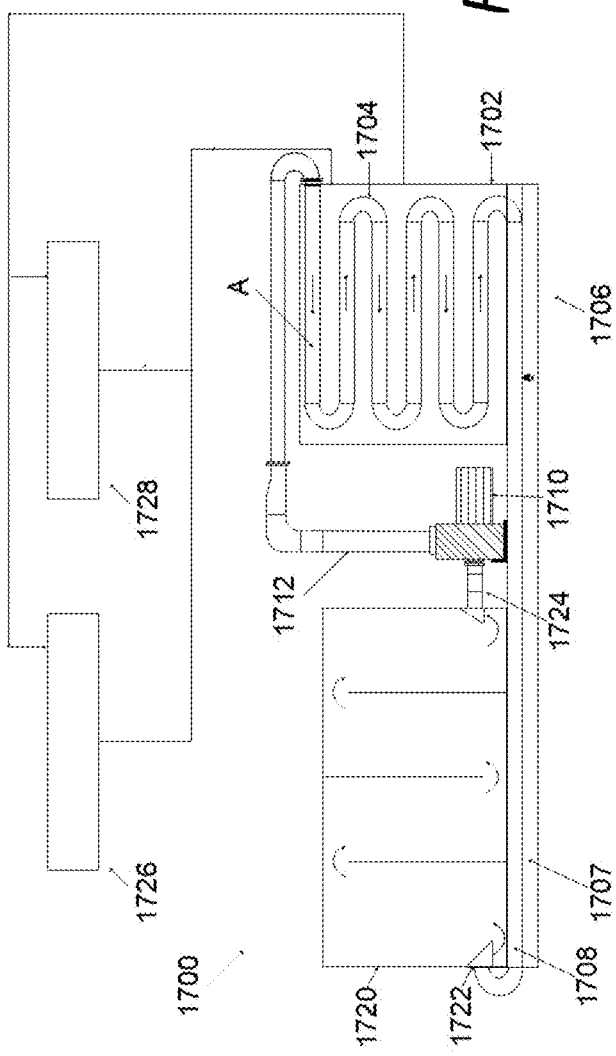
FIG. 19 is an overall block diagram of one embodiment of a high temperature water harvesting system, according to the present invention.

As shown in FIGS. 17-19, enhanced temperature water harvesting device 1700 is a mechanism that evaporates water by passing heated air over a water surface (the water interface between lower water chamber 1707 and upper evaporation chamber 1708) at temperatures above the boiling point of water at standard, temperature and pressure (STP). As shown in FIG. 19, enhanced temperature water harvesting system 1700 includes, in part, air heating chamber 1702, air directing tubes 1704, evaporation chamber 1706 having lower water chamber 1707 and upper evaporation chamber 1708, air mover 1710, conventional air conduit 1712, condenser 1720, condenser air inlet 1722 and condenser air outlet 1724. In this embodiment, the temperature of the air is elevated above the boiling point of water at STP in order to increase the water capacity per unit of air in the air heating chamber 1702. It is known that the capacity for water vapor in air increases by approximately a factor of two (2) for each 20° F. increase in air temperature. The result of raising the temperature from the previous 140° F. to 240° F. is that the capacity of enhanced temperature water harvesting system 1700 is increased by approximately 32 times.

Another component to attain the increased evaporation rates is to provide a strictly defined air path (air directing tubes 1704) within the air heating chamber 1702 to insure a specific air flow pattern and is elongated to allow sufficient contact time to increase the air temperature up to the 240° F. process design during each passage of the air through the air heating chamber 1702. It is to be understood that higher air temperatures (any amount above 240° C.) could be used but would require additional heating sources that would decrease the sustainable nature of the device. It is to be understood that at the higher temperatures (greater than 240° C.), the chiller HP would have to be increased to the point that it would require a grid connection or an engine/generator set.

The results of increasing air temperature within the air heating chamber 1702 are twofold: the overall size of the process equipment can be reduced to process similar volumes of water when compared to the known water harvesting apparatus; or, to process significantly more unconventional water to potable using the same physical size unit as the prior art apparatus.

It is to be understood that the enhanced temperature water harvesting device 1700 can be varied in size and configuration in order to attain the amounts of water desired. Devices can produce from thousands of gallons of water treated per day to millions of gallons of water treated. It is also to be understood that air mover 1710 can be any type of air-moving device, i.e.; fans or positive displacement blowers, or even vacuum devices. It is to be further understood that the method for increasing the temperature can be by gas, electric or oil-fired generation such as by a conventional oil/gas/electric heater 1726, but the preferred sustainable method is by use of a thermal heliostat 1728.

During the operation of enhanced temperature water harvesting device 1700, non-potable water is conventionally placed in evaporation chamber 1706, in particular, lower water chamber 1707. Heaters 1726 and/or 1728 are conventionally activated. Once the desired temperature has been reached in air chamber 1702, air mover 1710 causes the air in evaporation chamber 1706, in particular upper evaporation chamber 1708, to begin to move along with the air inside of air directing tubes 1704 which moves in a direction shown by arrows A.

As discussed above, the specific air flow pattern and the elongated nature of the air directing tubes 1704 creates a sufficient contact time between the air and the air directing tubes 1704 so that the air located within the air directing tubes 1704 is able to increase in temperature up to the 240°

F. This heating of the air in the air directing tubes 1704 will cause the air located within air directing tubes 1704 to significantly increase its capacity to hold water vapor, as discussed above.

After the air is heated in air heating chamber 1702, the heated air is transported along upper evaporation chamber 1708 so that the heated air contacts the surface of the non-potable water located in the lower water chamber 1707. The heated air interacts with the non-potable water and increases the water vapor of the heated air.

The heated air, now containing the increased amount of water vapor, is transported through the condenser air inlet 1722 of the condenser 1720. Once inside the condenser 1720, the heated air, now containing the increased amount of water vapor, is conventionally condensed so that the potable water is extracted from the heated air. After the water vapor has been extracted from the heated air in the condenser 1720, the cooled air is then transported through the condenser air outlet 1724 back to the air mover 1710 in order to start the process of enhanced temperature water harvesting.

Enhanced Temperature Water Harvesting Using Relative Humidity

The enhanced temperature water harvesting system 1800 is designed for atmospheric operation that condenses water directed to the unit from the atmosphere where it later precipitates as it flows through the closed-loop air stream by increasing the evaporation rate of the non-potable waters in excess of the design rate of the water harvesting device through the use of air temperatures elevated in excess of 140° F. and the measurement of relative humidity within the condenser 1820. This enhanced temperature will dramatically increase the water carrying capacity of the air. Furthermore, a closed-loop air stream is utilized by the apparatus to minimize energy needs.

Embodiments of the invention are discussed below with reference to FIG. 20. However, those skilled in the art will readily appreciate that the detailed description given herein with respect to this figure is for explanatory purposes as the invention extends beyond these limited embodiments.

Figure 20:
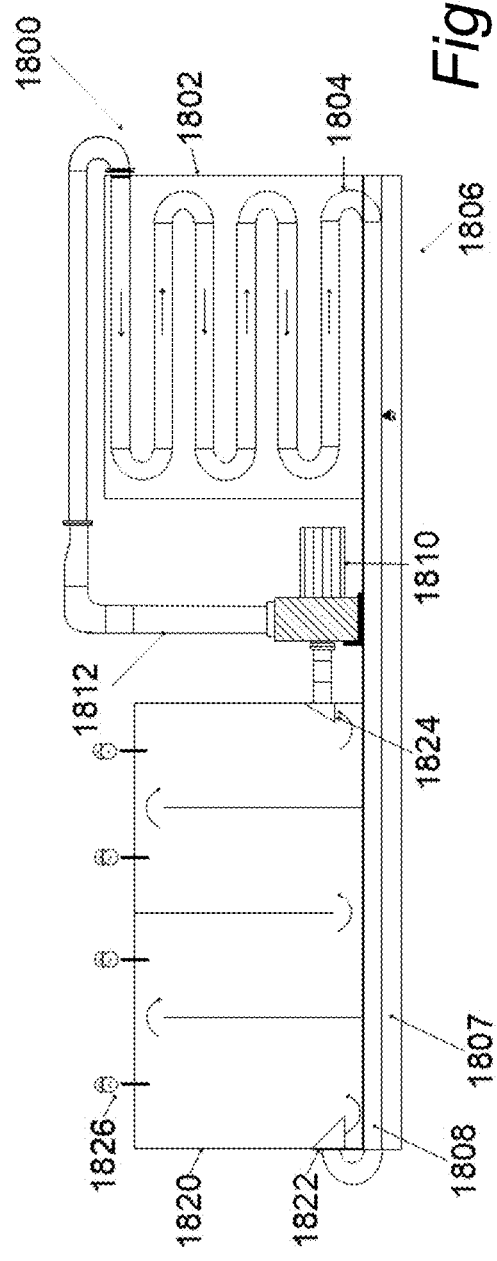
FIG. 20 shows an elevational view of another embodiment of a high temperature water harvesting system, according to the present invention.

As shown in FIG. 20, enhanced temperature water harvesting device 1800 is a mechanism that evaporates water by passing heated air over a water surface (the water interface between lower water chamber 1807 and upper evaporation chamber 1808) at temperatures above the boiling point of water at standard, temperature and pressure (STP) while measuring the relative humidity within the condenser 1820. As shown in FIG. 20, enhanced temperature water harvesting system 1800 includes, in part, air heating chamber 1802, air directing tubes 1804, evaporation chamber 1806 having lower water chamber 1807 and upper evaporation chamber 1808, air mover 1810, conventional air conduit 1812, condenser 1820, condenser air inlet 1822, condenser air outlet 1824 and conventional relative humidity sensors/transmitters 1826. In this embodiment, the temperature of the air is elevated above the boiling point of water at STP in order to increase the water capacity per unit of air in the air heating chamber 1802. It is known that the capacity for water vapor in air increases by approximately a factor of two (2) for each 20° F. increase in air temperature. The result of raising the temperature from the previous 140° F. to 240° F. is that the capacity of enhanced temperature water harvesting system 1800 is increased by approximately 32 times.

Another component to attain the increased evaporation rates is to provide a strictly defined air path (air directing tubes 1804), within the air heating chamber 1802 to insure a specific air flow pattern and is elongated to allow sufficient contact time to increase the air temperature up to the 240° F. process design during each passage of the air through the air heating chamber 1802. It is to be understood that higher air temperatures (any amount higher than 240° C.) could be used but would require additional heating sources that would decrease the sustainable nature of the device. It is to be understood that at the higher temperatures (greater than 240° C.), the chiller HP would have to be increased to the point that it would require a grid connection or an engine/generator set.

The results of increasing air temperature within the air heating chamber 1802 are twofold: the overall size of the process equipment can be reduced to process similar volumes of water when compared to the known water harvesting apparatus; or, to process significantly more unconventional water into potable using the same physical size unit as the prior art apparatus.

It is to be understood that the enhanced temperature water harvesting device 1800 can be varied in size and configuration in order to attain the amounts of water desired. Devices can produce from thousands of gallons of water treated per day to millions of gallons of water treated. It is also to be understood that air mover 1810 can be any type of air-moving device, i.e.; fans or positive displacement blowers, or even vacuum devices. It is to be further understood that the method for increasing the temperature can be by using solar gain to heat air heating chamber 1802 and air directing tubes 1804.

During the operation of enhanced temperature water harvesting device 1800, non-potable water is conventionally placed in evaporation chamber 1806, in particular, lower water chamber 1807. Solar gain is then used to heat air heating chamber 1802 and air directing tubes 1804. Once the desired temperature has been reached in air heating chamber 1082, air mover 1810 then causes the air in evaporation chamber 1806, in particular upper evaporation chamber 1808, to begin to move along with the air inside of air directing tubes 1804 which moves in a direction shown by arrows A.

As discussed above, the specific air flow pattern and the elongated nature of the air directing tubes 1804 provides a sufficient contact time between the air and the air directing tubes 1804 so that the air located within the air directing tubes 1804 is able to increase in temperature up to the 240° F. This heating of the air in the heating of air directing tubes 1804 will cause the air located within air directing tubes 1804 to significantly increase its capacity to hold water vapor, as discussed above.

After the air is heated in air heating chamber 1802, the heated air is transported along upper evaporation chamber 1808 so that the heated air contacts the surface of the non-potable water located in the lower water chamber 1807. The heated air interacts with the non-potable water and increases the water vapor of the heated air.

The heated air, now containing the increased amount of water vapor, is transported through the condenser air inlet 1822 of the condenser 1820. Once inside the condenser 1820, the heated air, now containing the increased amount of water vapor, is conventionally condensed so that the potable water is extracted from the heated air. In particular, the relative humidity of the air is continuously monitored within each condenser chamber by the relative humidity sensor/transmitter 1826.

It is to be understood that the relative humidity sensors/transmitters 1826 are conventionally connected and provide continuous data to the water harvester's control system (not shown). To optimize operation of the water harvester 1800, a minimum relative humidity level is set for each chamber.

When the relative humidity level exceeds the set level, a condenser module is put into operation. Conversely, if the relative humidity level drops below the set point, the condenser in that chamber is shut down, thereby allowing energy savings.

After the water vapor has been extracted from the heated air in the condenser 1820, the cooled air is then transported through the condenser air outlet 1824 back to the air mover 1810 in order to start the process of enhanced temperature water harvesting.

Waste Water Treatment System Using Nitrogen or Noble Gases

Figure 21:
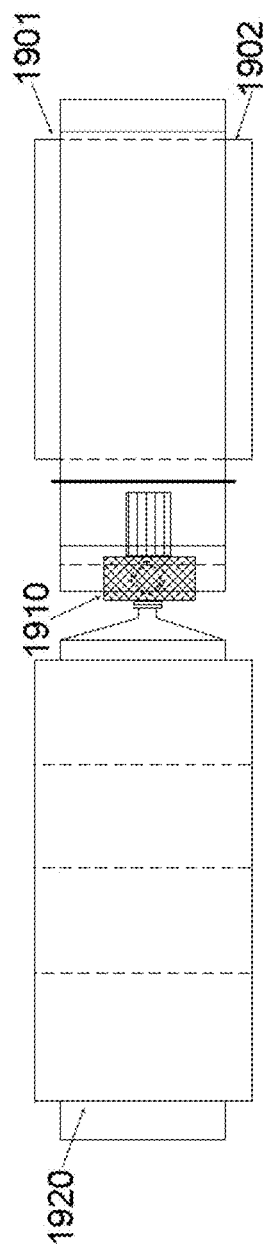
FIG. 21 shows a plan view of one embodiment of a closed-loop air heating chamber for the treatment of waste streams containing chemical constituents, according to the present invention.
Figure 22:
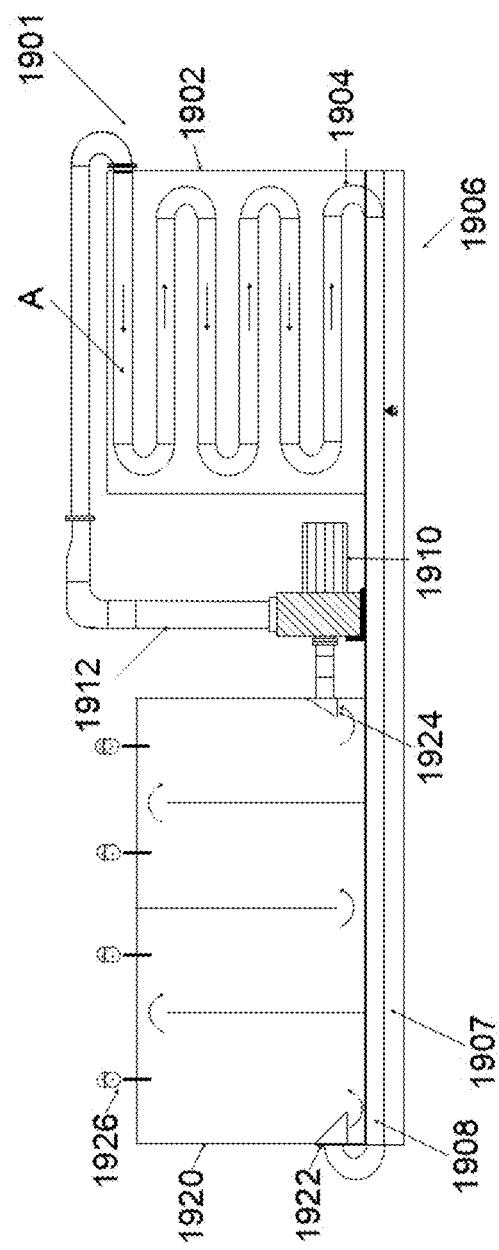
FIG. 22 shows an elevational view the closed-loop air heating chamber of FIG. 21, according to the present invention.
Figure 23:
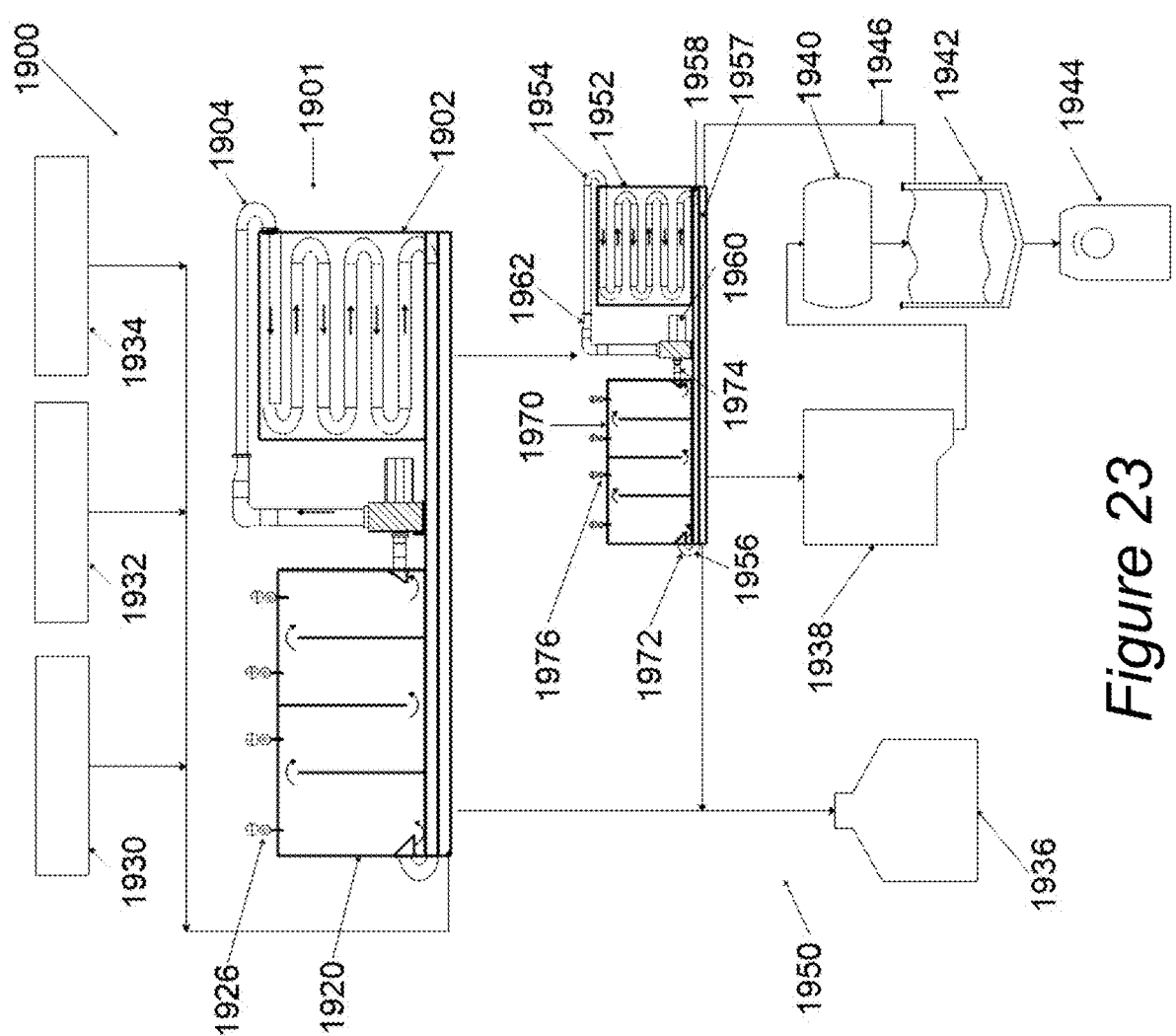
FIG. 23 is an overall block diagram of one embodiment of a nitrogen/noble gas waste stream processing system, according to the present invention.

FIGS. 21-23 illustrate the waste water treatment system 1900 using nitrogen or noble gases for the treatment of waste streams containing chemical constituents that will either precipitate or deposit on substrates when exposed to the presence of oxygen through use of a close-looped air stream consisting of non-reactive gases, such as nitrogen or noble gases. The compounds contained in these treatment streams must be maintained in solution throughout the concentrating process. The streams include flows from such processes as flue gas desulfurization (FGD) effluent containing calcium and sulfites and abandoned mine drainage (AMD), where iron, manganese and aluminum precipitate when exposed to oxygen.

As shown in FIGS. 21-23, the waste water treatment system 1900 is a mechanism that evaporates non-potable water by passing heated air over a water surface to obtain potable water through the use of a primary waste water treatment system 1901 and a concentrating waste water treatment system 1950. In this embodiment, a closed-loop air stream is utilized to insure the water stream being processed is not brought into contact with an oxygen-containing atmosphere. In particular, a nitrogen or noble gas atmosphere is substituted for the water carrying medium discussed previously.

As shown in FIGS. 22 and 23, primary waste water treatment system 1901 includes, in part, gas heating chamber 1902, gas directing tubes 1904, evaporation chamber 1906 having lower water chamber 1907 and upper evaporation chamber 1908, gas mover 1910, conventional gas conduit 1912, condenser 1920, condenser gas inlet 1922, condenser gas outlet 1924, conventional relative humidity sensors/transmitters 1926, contaminated water source 1930, metal-containing water source 1932, mineral-containing water source 1934, clean water source 1936, concentrate storage 1938, metal/mineral precipitation system 1940, gravity thickener 1942, dryer 1944, recycle line 1946 and concentrating waste water treatment system 1950. It is to be understood that primary waste water treatment system 1901 and concentrating waste water treatment system 1950 are constructed in substantially the same manner and include substantially the same components. In particular, concentrating waste water treatment system 1950 includes a gas heating chamber 1952, gas directing tubes 1954, an evaporation chamber 1956 having a lower water chamber 1957 and an upper evaporation chamber 1958, a gas mover 1960, a conventional gas conduit 1962, a condenser 1970, a condenser gas inlet 1972, a condenser gas outlet 1974, and conventional relative humidity sensors/transmitters 1976.

During the operation of waste water treatment system 1900, the non-potable water sources (contaminated water source 1930, metal-containing water source 1932 and mineral-containing water source 1934) are directed into the primary waste water treatment system 1901, where the flow volume upon operation is decreased by a factor of 80 to 90%. Screening (not shown) of oversize solids within the treatment stream may be utilized, if necessary.

The non-potable water from the non-potable water sources (contaminated water source 1930, metal-containing water source 1932 and mineral-containing water source 1934) is conventionally placed in evaporation chamber 1906, in particular, in lower water chamber 1907. Solar gain is then used to heat the non-oxygen containing gas (such as nitrogen or noble gases) in gas directing tubes 1904 in gas heating chamber 1902. It is to be understood that solar gain is not the only method that can be used to heat the gas heating chamber 1902. For instance, there may be waste heat available and, for reliability purposes, the end user may just use gas or oil-fired heating. Once the desired temperature has been reached in gas heating chamber 1902, gas mover 1910 then causes the gas in evaporation chamber 1906 having lower water chamber 1907 to begin to move along with the gas inside of gas directing tubes 1904 which moves in a direction shown by arrows A.

As discussed above, the specific gas flow pattern and the elongated nature of the gas directing tubes 1904 provides a sufficient contact time between the gas and the gas directing tubes 1804 so that the gas located within the gas directing tubes 1904 is able to increase in temperature up to 240° C. Any amount higher than 240° C. could be used but would require additional heating sources that would decrease the sustainable nature of the device. It is to be understood that at the higher temperatures (greater than 240° C.), the chiller HP would have to be increased to the point that it would require a grid connection or an engine/generator set.

This heating of the gas in the gas directing tubes 1904 will cause the gas located within air directing tubes 1904 to significantly increase its capacity to hold water vapor, as discussed above.

After the gas is heated in gas heating chamber 1902, the heated gas is transported along upper evaporation chamber 1908 so that the heated gas contacts the surface of the non-potable water located in the lower water chamber 1907. The heated gas interacts with the non-potable water and increases the water vapor of the heated gas.

The heated gas, now containing the increased amount of water vapor, is transported through the condenser gas inlet 1922 of the condenser 1820. Once inside the condenser 1820, the heated gas, now containing the increased amount of water vapor, is conventionally condensed so that the potable water is extracted from the heated gas. The potable water is then directed to the clean water storage 1936 for future use.

It is to be understood that the concentrate formed and remaining in the evaporation chamber 1906 is conventionally monitored and upon reaching a set concentration is directed to the concentrating waste water treatment system 1950 for further concentration of the contaminants. It is to be further understood that the flow in the concentrating waste water treatment system 1950 may be recycled numerous times (through the use of recycle line 1946) to further increase the concentration of the contaminants. With each treatment cycle, clean water is removed from the treatment stream and is also directed to clean water storage 1936.

It is to be further understood that the concentrate formed in the evaporation chamber 1906 of the concentrating waste water treatment system 1950 is monitored and upon reaching a set concentration is directed to concentrate storage 1938 to await further processing. It is to be understood that a non-oxygen containing atmosphere must be maintained in each process vessel.

Final processing of the concentrate occurs when the flow is directed to a conventional metal/mineral precipitation processing device 1940 for conventional precipitation and dewatering. It is to be understood that precipitation of oxidized compounds will not occur in this apparatus as oxygen is precluded from contacting the chemicals in solution until the final processing stage, at the metal/mineral precipitation processing device 1940.

It is to be understood that within the metal/mineral precipitation processing device 1940, the soluble compounds will be contacted with oxygen, either from atmosphere or direct pure oxygen injection (not shown) to cause the soluble compounds to precipitate from solution. In select cases, the precipitated solids will be directed to a conventional gravity thickener 1942 for additional concentration of the solids. Overflow from the gravity thickener 1942 is recycled through a conventional recycle line 1946 to the concentrating waste water treatment system 1950 for recovery of any soluble compounds remaining in solution. The concentrated solids may then be directed to a conventional dryer 1944 for final preparation or provided in a slurry form to the final processor for final recovery.

With respect to relative humidity sensor/transmitters 1926/1976, the relative humidity of the gas is continuously monitored within each condenser chamber by the relative humidity sensor/transmitter 1926/1976. It is to be understood that the relative humidity sensors/transmitters 1926/1976 are conventionally connected and provide continuous data to the water harvester's control system (not shown). To optimize operation of the primary waste water treatment system 1901 and concentrating waste water treatment system 1950, a minimum relative humidity level is set for each chamber. When the relative humidity level exceeds the set level, a condenser module is put into operation. Conversely, if the relative humidity level drops below the set point, the condenser in that chamber is shut down allowing energy savings.

After the water vapor has been extracted from the heated gas in the condenser 1920/1970, the cooled gas is then transported through the condenser gas outlet 1924/1974 back to the gas mover 1910/1960 in order to start the process of water harvesting.

Figure 24:
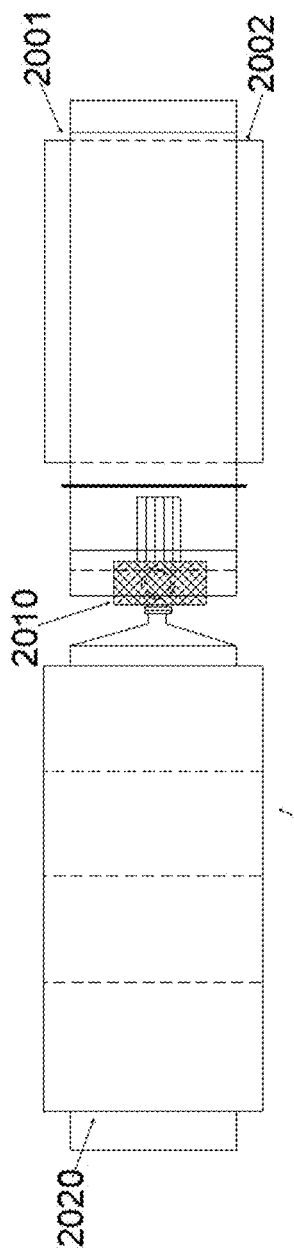
FIG. 24 shows a plan view of a second embodiment of a closed-loop air heating chamber, according to the present invention.
Figure 25:
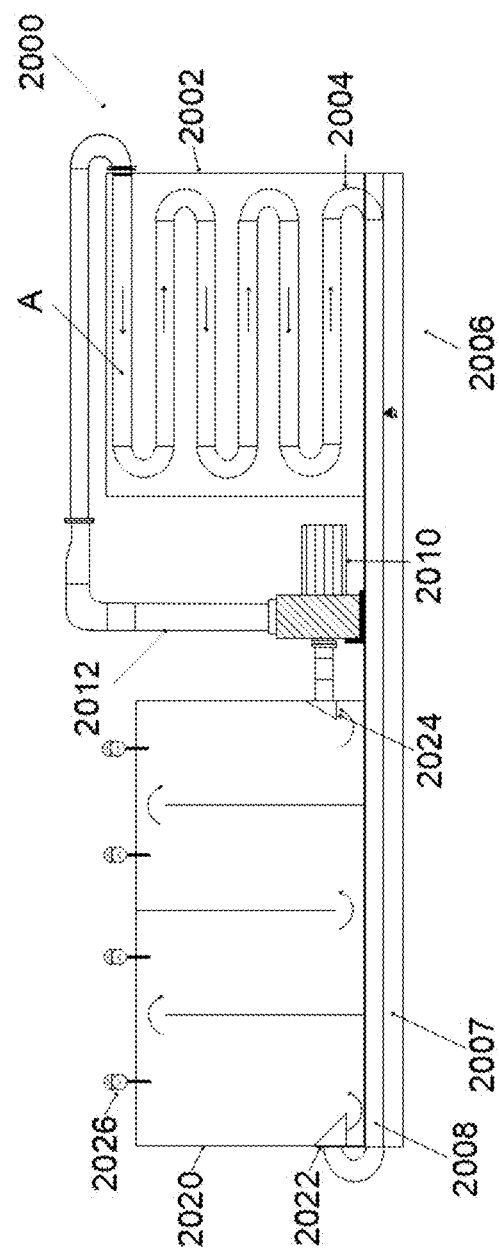
FIG. 25 shows an elevational view the closed-loop air heating chamber of FIG. 24, according to the present invention.
Figure 26:
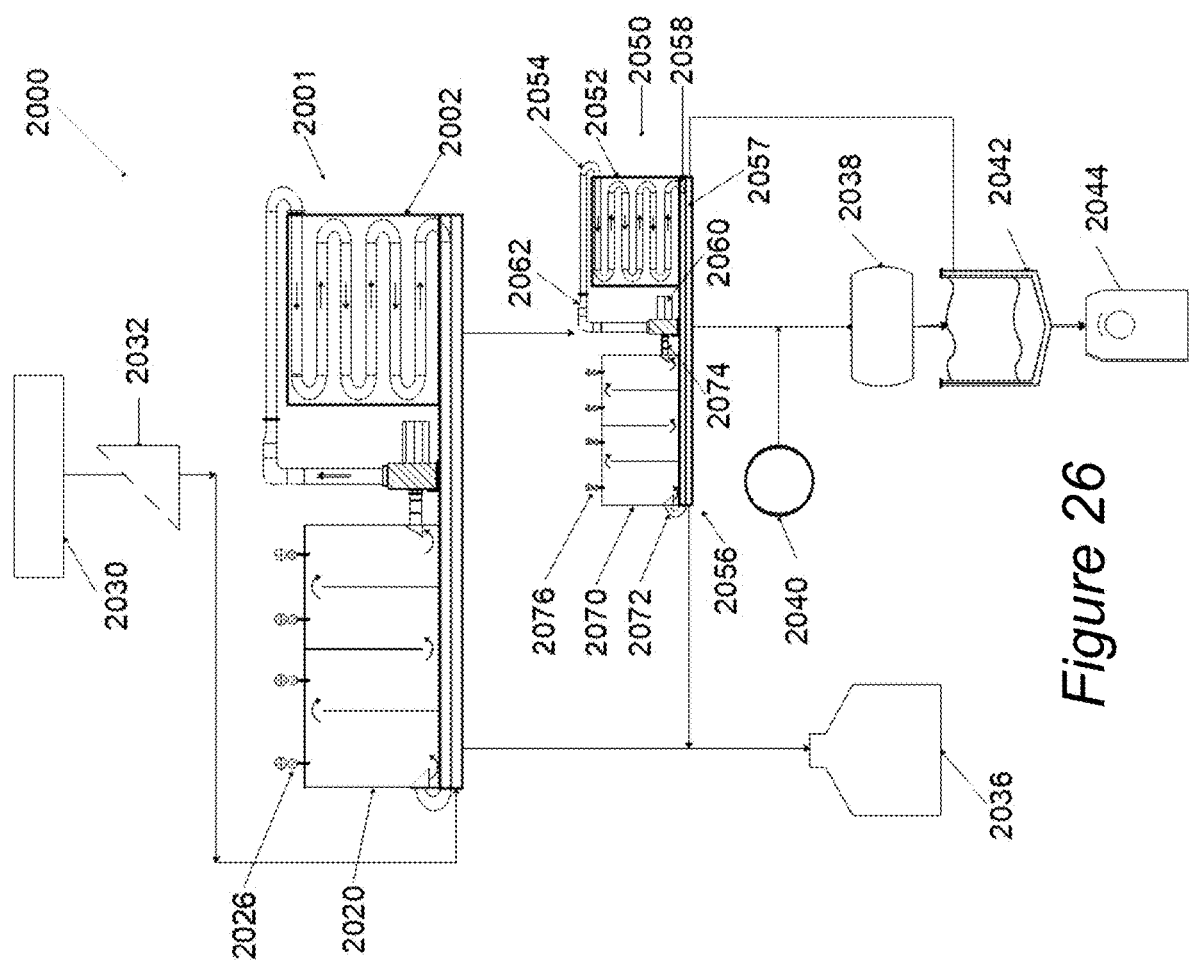
FIG. 26 is an overall block diagram of one embodiment of a flue gas desulfurization (FGD) effluent processing system, according to the present invention.

Waste Water Treatment System Using Nitrogen or Noble Gases to Remove Gypsum from Flue Gas Desulfurization Effluent FIGS. 24-26 illustrate the waste water treatment system 2000 using nitrogen or noble gases for the treatment of waste streams to obtain gypsum from flue gas desulfurization (FGD) effluent. The effluent is derived from the treatment of flue gases from power plant air streams containing sulfur compounds by the addition of calcium-based reactants. This effluent is very hard to treat as it will scale (precipitate) on any surface when the process stream is contacted with oxygen.

The two-part process uses a closed-looped air stream consisting of non-reactive gases, such as nitrogen or noble gases, to concentrate the calcium and sulfites present in solution in the effluent stream prior to discharging the effluent into a reactor where air or pure oxygen is injected into the process stream resulting in the precipitation of gypsum.

As shown in FIGS. 25 and 26, primary waste water treatment system 2001 includes, in part, gas heating chamber 2002, gas directing tubes 2004, evaporation chamber 2006 having lower water chamber 2007 and upper evaporation chamber 2008, gas mover 2010, conventional gas conduit 2012, condenser 2020, condenser gas inlet 2022, condenser gas outlet 2024, conventional relative humidity sensors/transmitters 2026, contaminated water source 2030, conventional screen 2032, clean water source 2036, precipitated calcium sulfate (gypsum) storage 2038, air or pure oxygen feed 2040, gravity thickener 2042 for precipitated calcium sulfate (gypsum), dryer 2044, recycle line 2046 and concentrating waste water treatment system 2050. It is to be understood that primary waste water treatment system 2001 and concentrating waste water treatment system 2050 are constructed in substantially the same manner and include substantially the same components. In particular, concentrating waste water treatment system 2050 includes a gas heating chamber 2052, gas directing tubes 2054, an evaporation chamber 2056 having a lower water chamber 2057 and an upper evaporation chamber 2058, a gas mover 2060, a conventional gas conduit 2062, a condenser 2070, a condenser gas inlet 2072, a condenser gas outlet 2074, and conventional relative humidity sensors/transmitters 2076.

During the operation of waste water treatment system 2000, the non-potable water sources (contaminated water source 2030) is directed through a preliminary screen 2032 and then into the primary waste water treatment system 2001, where the flow volume upon operation is decreased by a factor of 80 to 90%.

The non-potable water from the non-potable water sources 2030 is conventionally placed in evaporation chamber 2006, in particular, in lower water chamber 2007. Solar gain is then used to heat the non-oxygen containing gas (such as nitrogen or noble gases) in gas directing tubes 2004 in gas heating chamber 2002. Once the desired temperature has been reached in gas heating chamber 2002, gas mover 2010 then causes the gas in evaporation chamber 2006, in particular upper evaporation chamber 2008, to begin to move along with the gas inside of gas directing tubes 2004 which moves in a direction shown by arrows A.

As discussed above, the specific air flow pattern and the elongated nature of the gas directing tubes 2004 provides a sufficient contact time between the gas and the gas directing tubes 2004 so that the gas located within the gas directing tubes 2004 is able to increase in temperature up to 240° C. Any amount higher than 240° C. could be used but would require additional heating sources that would decrease the sustainable nature of the device. It is to be understood that at the higher temperatures (greater than 240° C.), the chiller HP would have to be increased to the point that it would require a grid connection or an engine/generator set.

This heating of the gas in the gas directing tubes 2004 will cause the gas located within air directing tubes 2004 to significantly increase its capacity to hold water vapor, as discussed above.

After the gas is heated in gas heating chamber 2002, the heated gas is transported along upper evaporation chamber 2008 so that the heated gas contacts the surface of the non-potable water located in the lower water chamber 2007. The heated gas interacts with the non-potable water and increases the water vapor of the heated gas.

The heated gas, now containing the increased amount of water vapor, is transported through the condenser gas inlet 2022 of the condenser 2020. Once inside the condenser 2020, the heated gas, now containing the increased amount of water vapor, is conventionally condensed so that the potable water is extracted from the heated gas. The potable water is then directed to the clean water storage 2036 for future use.

It is to be understood that the concentrate containing the calcium and sulfur-containing compounds left in solution in the evaporation chamber 2006 is conventionally monitored and upon reaching a set concentration is directed to the concentrating waste water treatment system 2050 for further concentration of the contaminants. It is to be further understood that the flow in the concentrating waste water treatment system 2050 may be recycled numerous times (thorough the use of recycle line 2046) to further increase the concentration of the contaminants. With each treatment cycle, clean water is removed from the treatment stream and is also directed to clean water storage 2036.

It is to be further understood that the concentrate containing the calcium and sulfur-containing compounds in the evaporation chamber 2056 of the concentrating waste water treatment system 2050 is monitored and upon reaching a set concentration is directed to the final phase reactor (the precipitated calcium sulfate (gypsum) storage 2038) for further processing. It is to be understood that a non-oxygen containing atmosphere must be maintained in each process vessel prior to the final phase reactor (the precipitated calcium sulfate (gypsum) storage 2038).

It is to be understood that the final phase reactor (the precipitated calcium sulfate (gypsum) storage 2038) is constructed with sides coated with a non-stick coating to avoid scaling when the precipitation phase is initiated. It is to be further understood that the concentrate is mixed with air or a pure oxygen from conventional air or a pure oxygen feeder 2040 prior to entering the final phase reactor (the precipitated calcium sulfate (gypsum) storage 2038) in order to initiate precipitation of the calcium and sulfites into calcium sulfate (gypsum.)

The precipitated calcium sulfate is then directed to the gravity thickener 2042 and upon further concentration of the precipitates is sent to the dryer 2044 for final processing. It is to be understood that the non-potable water from gravity thickener 2042 can be transported to evaporation chamber 2056 through recycle line 2046 for further processing.

With respect to relative humidity sensor/transmitters 2026/2076, the relative humidity of the gas is continuously monitored within each condenser chamber by the relative humidity sensor/transmitter 2026/2076. It is to be understood that the relative humidity sensors/transmitters 2026/2076 are conventionally connected and provide continuous data to the water harvester's control system (not shown). To optimize operation of the primary waste water treatment system 2001 and concentrating waste water treatment system 2050, a minimum relative humidity level is set for each chamber. When the relative humidity level exceeds the set level, a condenser module is put into operation. Conversely, if the relative humidity level drops below the set point, the condenser in that chamber is shut down allowing energy savings.

After the water vapor has been extracted from the heated gas in the condenser 2020/2070, the cooled gas is then transported through the condenser gas outlet 2024/2074 back to the gas mover 2010/2060 in order to start the process of water harvesting.

Water Harvesting System Producing Carbon Dioxide Sequestration

Figure 29:
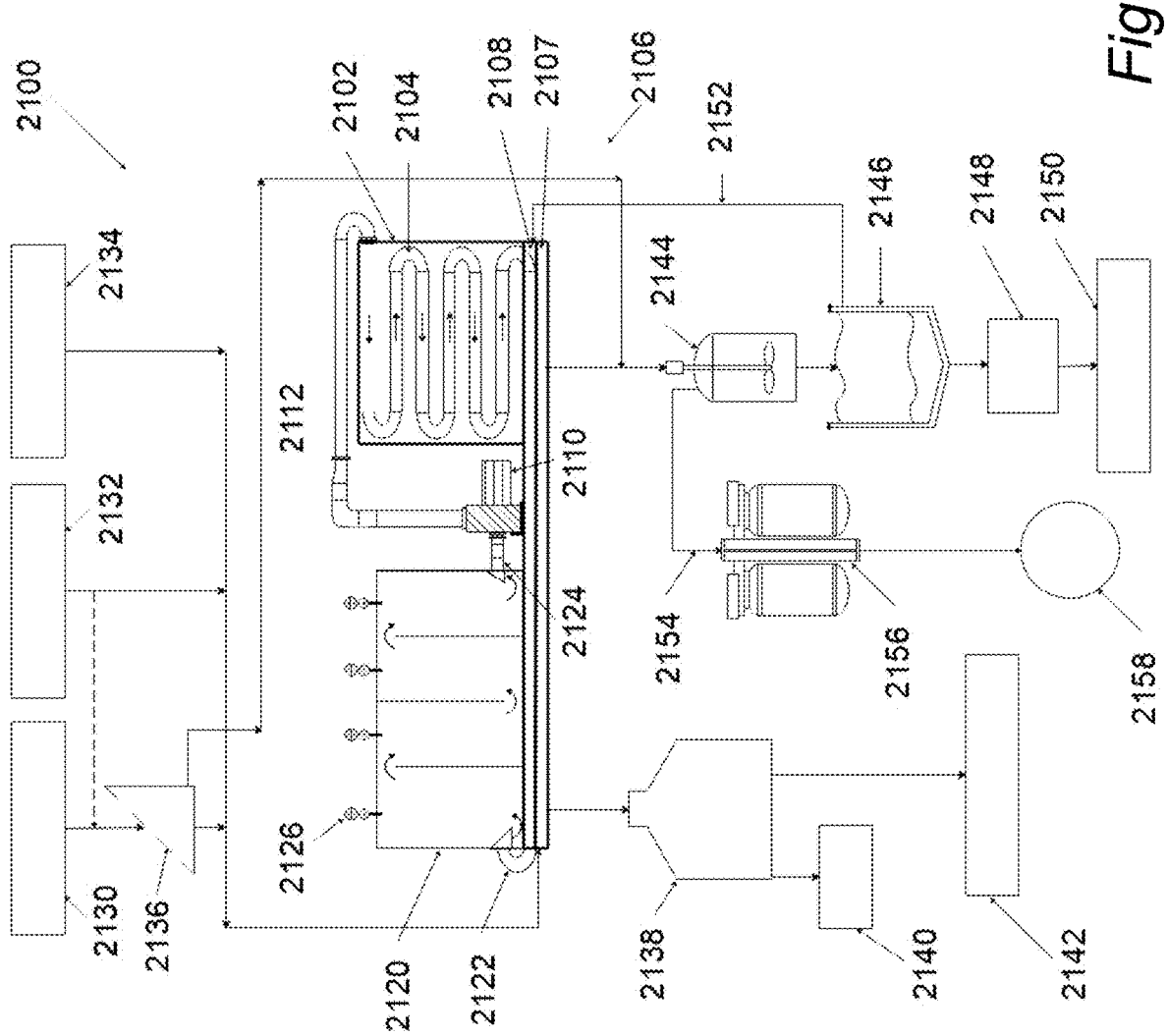
FIG. 29 is an overall block diagram of one embodiment of a carbon dioxide sequestration processing system, according to the present invention.

FIGS. 27-29 illustrate the water harvesting system 2100 to produce sufficient water in arid and semi-arid climates by sequestering carbon dioxide from the atmosphere into the soil and biomass through harvesting water from the atmosphere, wastewater treatment and non-potable water through the use of high rate biomass growth. A key component of the process is the Wastewater to Energy (WW2E) process which will be discussed in greater detail later.

Besides the primary focus of creating a carbon sequestration process, the water harvesting system 2100 will also be able to provide off-the-grid wastewater treatment to communities that have no current sanitary service; provide methane to be used for cooking and heating, thereby reducing the need for charcoal, provide methane for electrical generation; and by substituting bamboo for existing trees in charcoal production, thereby reducing deforestation. Furthermore, by producing saleable end products, charcoal, bamboo for timber, crops, and selling carbon credits, the water harvesting system 2100 is self-funding after the initial investment to purchase and install the unit.

As shown in FIGS. 27-29, waste water treatment device 2100 includes, in part, air heating chamber 2102, air directing tubes 2104, evaporation chamber 2106 having lower water chamber 2107 and upper evaporation chamber 2108, air mover 2110, conventional air conduit 2112, condenser 2120, condenser air inlet 2122, condenser air outlet 2124, conventional relative humidity sensors/transmitters 2126, sanitary wastewater source 2030, contaminated water source 2132, atmospheric water source 2134, biosolids screen 2136, clean water storage 2138, drip irrigation to crops device 2140, drip irrigation to bamboo plantation device 2142, anaerobic reactor 2144, gravity thickener 2146, biosolids composter 2148, field application device 2150, recycle line 2152, gas line from anaerobic reactor 2154, gas storage tanks 2156 and gas-fired engine/generator set 2158.

The water harvesting system 2100 is a mechanism that evaporates water by passing heated air over a water surface. In this embodiment, the water harvesting system 2100 is a hybrid apparatus that is created to take moisture directly from the atmosphere as well as evaporate liquid water from non-potable sources, such as wastewater and contaminated surface and groundwaters.

The basis of the water harvesting system 2100 is to provide sufficient water to create new biomass in arid and semi-arid climatic regions of the world. The additional biomass will be able to remove substantial amounts of carbon dioxide from the atmosphere and sequester it into the new biomass and soil. By incorporating fast growing plants, such as bamboo, the carbon sequestration rate will be higher than normally attained with native plantings.

It is to be understood that the water harvesting system 2100 can be located near the ocean and use seawater as a source or inland where water can be attained through atmospheric water harvesting and treatment of wastewater or contaminated surface and ground waters.

During the operation of water harvesting system 2100, the non-potable water sources (contaminated water sources 2130, 2132 and 2134) is directed through a preliminary screen 2136 and then into the water harvesting system 2100, where the flow volume upon operation is decreased by a factor of 80 to 90%. It is to be understood that biosolids collected by the screen 2136 are directed to the anaerobic reactor 2144 for further treatment.

The non-potable water from the non-potable water sources (contaminated water sources 2130, 2132 and 2134) is conventionally placed in evaporation chamber 2106, in particular, in lower water chamber 2107. Solar gain is then used to heat the air in air directing tubes 2104 in air heating chamber 2102. Once the desired temperature has been reached in air heating chamber 2102, air mover 2110 then causes the air in evaporation chamber 2106, in particular upper evaporation chamber 2108, to begin to move along with the air inside of air directing tubes 2104 which moves in a direction shown by arrows A.

As discussed above, the specific air flow pattern and the elongated nature of the air directing tubes 2104 provides a sufficient contact time between the air and the air directing tubes 2104 so that the air located within the air directing tubes 2104 is able to increase in temperature up to 240° F. This heating of the air in the air directing tubes 2104 will cause the air located within air directing tubes 2104 to significantly increase its capacity to hold water vapor.

After the air is heated in air heating chamber 2102, the heated air is transported along upper evaporation chamber 2008 so that the heated air contacts the surface of the non-potable water located in the lower water chamber 2107. The heated air interacts with the non-potable water and increases the water vapor of the heated air, as discussed above.

The heated air, now containing the increased amount of water vapor, is transported through the condenser air inlet 2122 of the condenser 2120. Once inside the condenser 2120, the heated air, now containing the increased amount of water vapor, is conventionally condensed so that the potable water is extracted from the heated air. The potable water is then directed to the clean water storage 2138 for future use in irrigating the bamboo plantation (drip irrigation to bamboo plantation 2142) and/or drip irrigation to crops device 2140.

When treating wastewater, the biochemical oxygen demand (BOD) concentrate being formed in the evaporation chamber 2106 is monitored and upon reaching a set concentration is directed to the anaerobic reactor 2144 for further treatment of the contaminants. It is to be understood that the flow in the water harvesting device 2101 may be recycled numerous times (through the use of recycle line 2152) in order to further increase the concentration of the soluble organic fraction. With each treatment cycle, clean water is removed from the treatment stream and is directed to the clean water storage 2138.

It is to be further understood that the anaerobic reactor 2144 is used to reduce the (BOD) of the wastewater through the action of anaerobic bacteria. The anaerobic reactor 2144 treats the organic fraction using anaerobic bacteria which breaks down the organics into $CO_2$ (carbon dioxide) and $CH_4$ (methane) through numerous steps. The BOD is derived from the soluble BOD present in the water harvester concentrate and from the biosolids screened from the incoming flow. Sludge (inert remains of bacterial organisms) is produced and is directed to a gravity thickener 2146 to increase its concentration prior to drying and composting in conventional biosolids composter 2148. Composting of the solids disinfects the waste through thermal destruction of the microorganisms. The sludge retains nitrogen and phosphorus compounds which are then available for field application by field application device 2150, as soil supplements after the composting process is completed. It is to be understood that the non-potable water from gravity thickener 2146 can be transported to evaporation chamber 2106 through recycle line 2152 for further processing.

The biogas, $CO_2$ and $CH_4$, generated by the anaerobic reactor 2144 is sent to gas storage device 2156 prior to being used to operate an engine/generator 2158 which is/are set to produce electricity. The electricity generated can be used internally to run the water harvesting system 2100 or to feed batteries for local use.

It is to be further understood that the water generated by the water harvesting system 2100 can be used to grow biomass. To obtain the maximum carbon sequestration rates, a fast-growing plant must be used. It should also be a plant with intrinsic value as a harvested crop as constant harvesting to induce rapid growth phase is required to maintain the desired sequestration rate. For example, a plant such as bamboo may be considered as the primary plant due to its maximum carbon sequestration rates although food crops could be considered for use of a portion of the water generated.

With respect to relative humidity sensor/transmitters 2126, the relative humidity of the air is continuously monitored within each condenser chamber by the relative humidity sensor/transmitters 2126. It is to be understood that the relative humidity sensors/transmitters 2126 are conventionally connected and provide continuous data to the water harvester's control system (not shown). To optimize operation of the water harvesting system 2100, a minimum relative humidity level is set for each chamber. When the relative humidity level exceeds the set level, a condenser module is put into operation. Conversely, if the relative humidity level drops below the set point, the condenser in that chamber is shut down allowing energy savings.

After the water vapor has been extracted from the heated air in the condenser 2120, the cooled air is then transported through the condenser gas outlet 2124/2174 back to the air mover 2110 in order to start the process of water harvesting.

Water Harvesting System for Converting Wastewater to Energy (WW2E)

Figure 30:
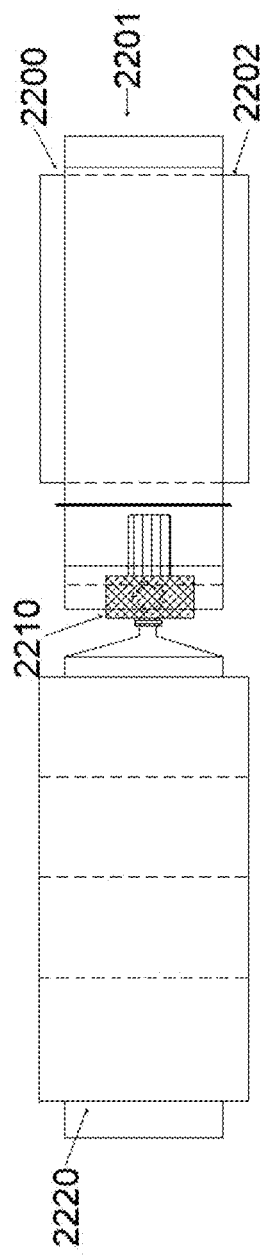
FIG. 30 shows a plan view of a fourth embodiment of a closed-loop air heating chamber, according to the present invention.
Figure 31:
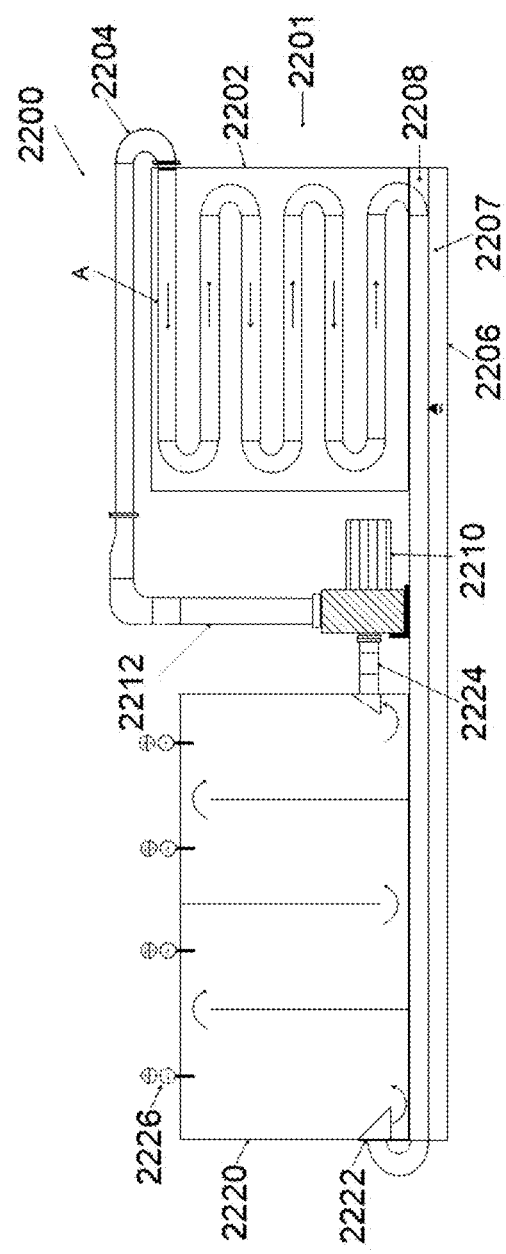
FIG. 31 shows an elevational view the closed-loop air heating chamber of FIG. 30, according to the present invention.
Figure 32:
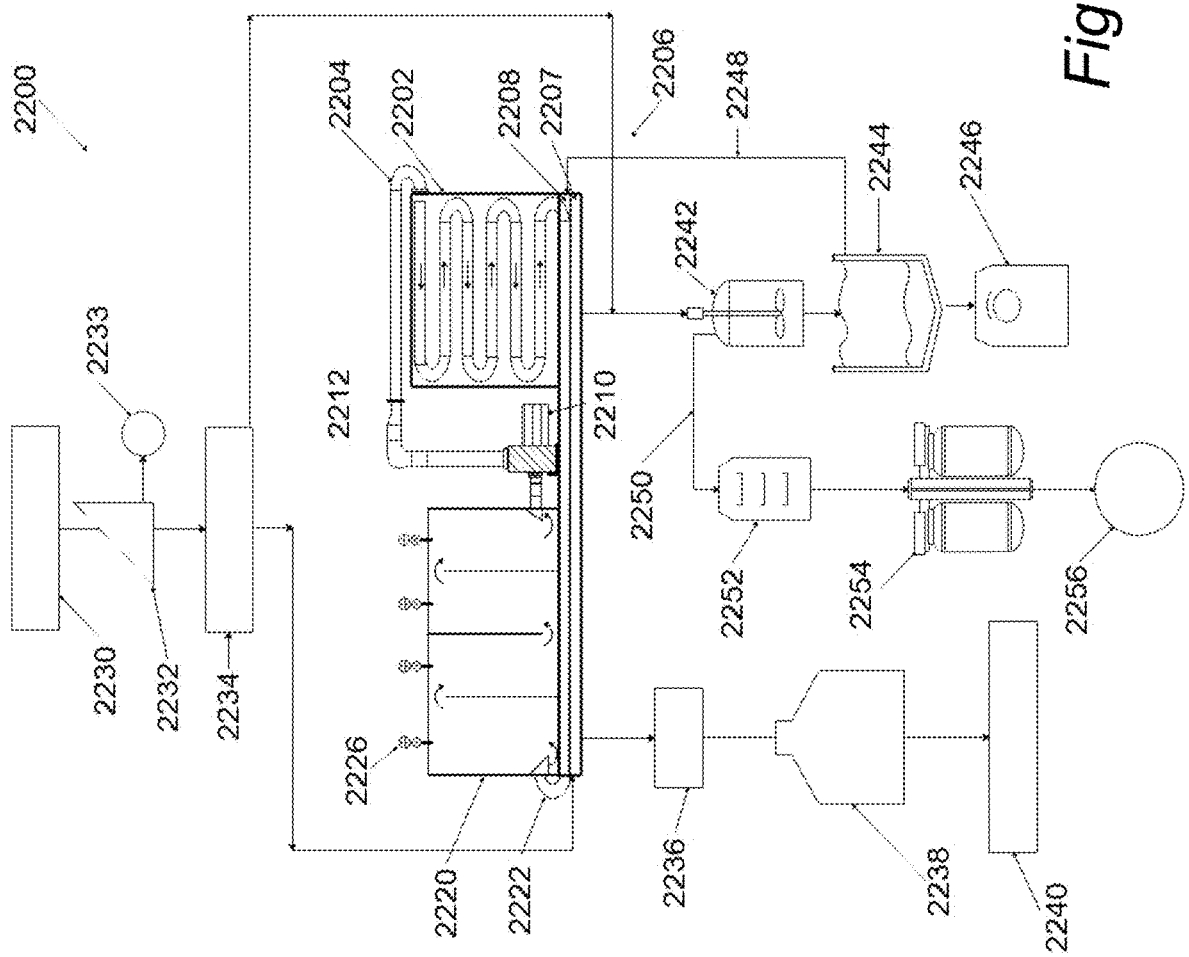
FIG. 32 is an overall block diagram of one embodiment of a processing system for converting wastewater to water, according to the present invention.

FIGS. 30-32 illustrate the water harvesting system 2200 for converting wastewater with biochemical oxygen demand (BOD) concentrations less than 1,000 mg/l to concentrations in excess of 1,000 mg/l. The method will use the water harvester 2200 to create the concentrated feedstock for an anaerobic reactor to treat the remaining organic fraction of the wastewater to discharge standards.

Municipal wastewater is defined as a water contaminated by primarily organic contaminants derived from diluted sanitary flows from humans and industry. These wastes are measured in terms of biochemical oxygen demand (BOD), i.e.; how much oxygen is required to oxidize the organic contaminant fraction. Typically, the strength of municipal wastewater ranges from 150 to 300 milligrams per liter (mg/L). The most cost-effective method at this time is to treat this wastewater by aerobic treatment methods. Anaerobic (without oxygen) treatment is a more cost effective, sustainable treatment method but requires an initial BOD concentration above 1,000 mg/l.

As shown in FIGS. 30-32, waste water harvesting system 2200 includes, in part, air heating chamber 2202, air directing tubes 2204, evaporation chamber 2206 having lower water chamber 2207 and upper evaporation chamber 2208, air mover 2210, conventional air conduit 2212, condenser 2220, condenser air inlet 2222, condenser air outlet 2224, conventional relative humidity sensors/transmitters 2226, municipal wastewater source 2230, biosolids screen 2232, landfill 2233, primary treatment cell (clarifier) 2234, disinfection device 2236, clean water storage 2238, purple pipe recycled water device 2240, anaerobic reactor 2242, gravity thickener 2244, sludge press/dryer 2246, recycle line 2248, gas line from anaerobic reactor 2250, gas dryer 2252, gas storage tanks 2254, and gas-fired engine/generator set 2156.

During the operation of water harvesting system 2200, the non-potable water sources (municipal wastewater source 2230) is directed through a preliminary screen 2232 and then goes through the primary settling treatment cell (clarifier) 2234. The effluent is then directed into the water harvesting system 2200 for secondary/tertiary treatment resulting in a high BOD concentrate remaining, the high strength feedstock required for the anaerobic reactor 2242.

The non-potable water from the non-potable water sources (municipal wastewater source 2230) is conventionally placed in evaporation chamber 2206, in particular, in lower water chamber 2207. Solar gain is then used to heat the air in air directing tubes 2204 in air heating chamber 2202. Once the desired temperature has been reached in air heating chamber 2202, air mover 2210 then causes the air in evaporation chamber 2206, in particular upper evaporation chamber 2208, to begin to move along with the air inside of air directing tubes 2204 which moves in a direction shown by arrows A.

As discussed above, the specific air flow pattern and the elongated nature of the air directing tubes 2204 provides a sufficient contact time between the air and the air directing tubes 2204 so that the air located within the air directing tubes 2204 is able to increase in temperature up to 240° F. This heating of the air in the air directing tubes 2204 will cause the air located within air directing tubes 2204 to significantly increase its capacity to hold water vapor.

After the air is heated in air heating chamber 2202, the heated air is transported along upper evaporation chamber 2208 so that the heated air contacts the surface of the non-potable water located in the lower water chamber 2207. The heated air interacts with the non-potable water and increases the water vapor of the heated air, as discussed above.

The heated air, now containing the increased amount of water vapor, is transported through the condenser air inlet 2222 of the condenser 2220. Once inside the condenser 2220, the heated air, now containing the increased amount of water vapor, is conventionally condensed so that the potable water is extracted from the heated air. The potable water is then directed to the disinfection device 2236 prior to being sent to clean water storage 2238. The treated water from storage 2238 is then available for recycling through use as purple pipe (non-potable) use (purple pipe recycled water device 2240); potable use with chlorine addition; or aquifer recharge.

It is to be understood that the anaerobic reactor 2242 treats the organic fraction using anaerobic bacteria which breaks down the organics into $CO_2$ and $CH_4$ (methane) through numerous steps. Sludge (inert remains of bacterial organisms) is produced and is directed to a gravity thickener 2244 to increase its concentration prior to dewatering and drying in sludge press/dryer 2246. The dried sludge retains nitrogen and phosphorus compounds which are then available for soil supplements. It is to be understood that the non-potable water from gravity thickener 2244 can be transported to evaporation chamber 2206 through recycle line 2248 for further processing.

The biogas, $CO_2$ and $CH_4$, generated by the anaerobic reactor 2242 is sent to a gas dryer 2252 through gas line 2250, and then to gas storage tanks 2254 prior to being used to operate an engine/generator set 2256 to produce electricity. The electricity generated can be used internally to run the waste water treatment system 2200 to get close to net zero operation costs or be sold to the electrical grid to recover treatment costs.

With respect to relative humidity sensor/transmitters 2226, the relative humidity of the air is continuously monitored within each condenser chamber by the relative humidity sensor/transmitter 2226. It is to be understood that the relative humidity sensors/transmitters 2226 are conventionally connected and provide continuous data to the water harvester's control system (not shown). To optimize operation of the water harvesting system 2200, a minimum relative humidity level is set for each chamber. When the relative humidity level exceeds the set level, a condenser module is put into operation. Conversely, if the relative humidity level drops below the set point, the condenser in that chamber is shut down thereby, allowing energy savings.

After the water vapor has been extracted from the heated air in the condenser 2220, the cooled air is then transported through the condenser gas outlet 2224 back to the air mover 2210 in order to start the process of water harvesting.

Waste Water Treatment System by Concentrating Metal and Minerals

Figure 33:
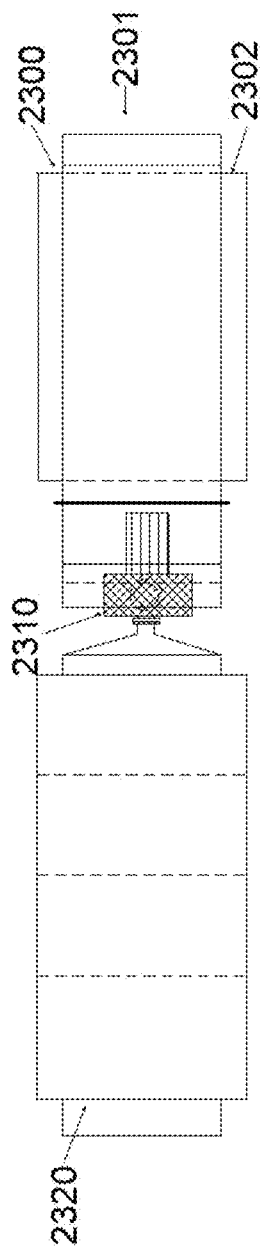
FIG. 33 shows a plan view of a fifth embodiment of a closed-loop air heating chamber, according to the present invention.
Figure 34:
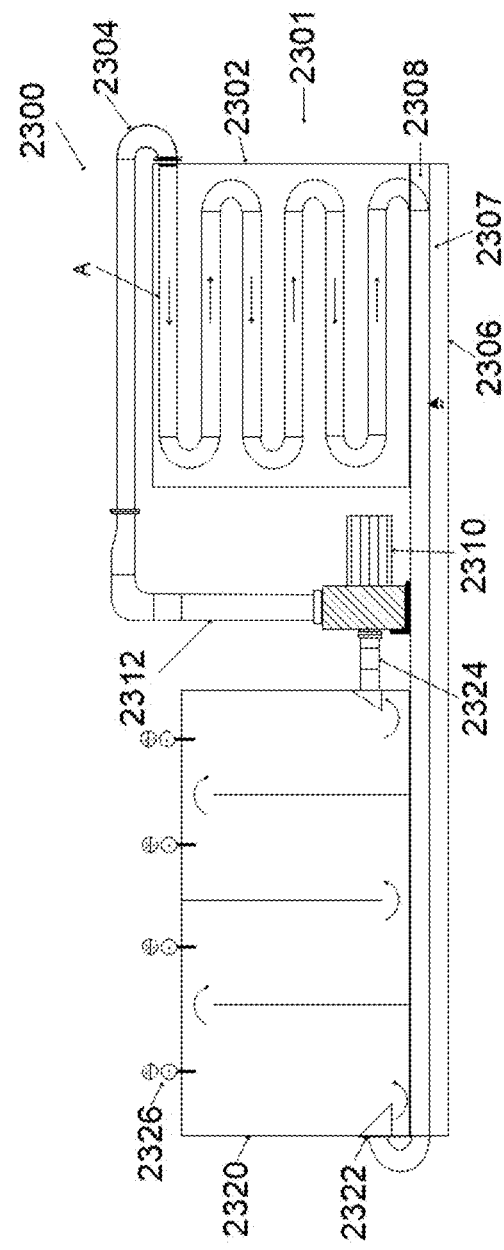
FIG. 34 shows an elevational view the closed-loop air heating chamber of FIG. 33, according to the present invention.
Figure 35:
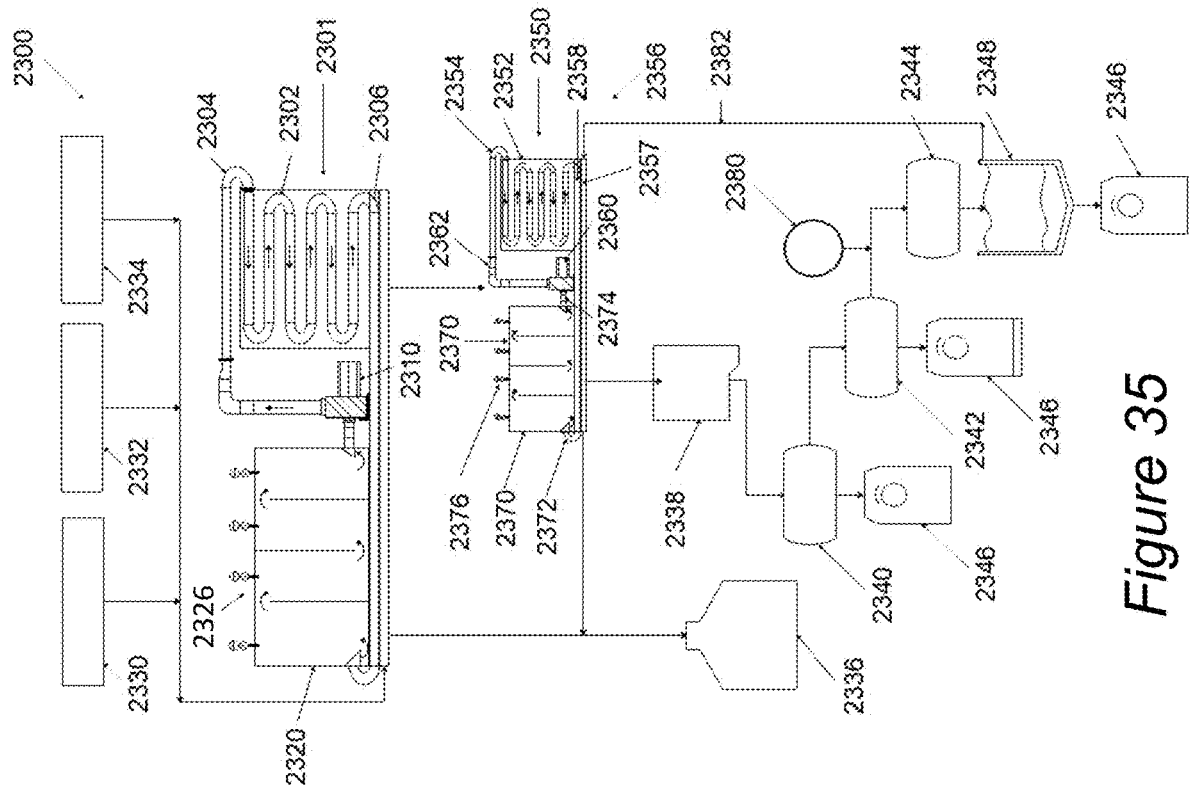
FIG. 35 is an overall block diagram of one embodiment of a processing system for removing concentrate metal and mineral (metal) species from wastewater, according to the present invention.

FIGS. 33-35 illustrate the waste water treatment system 2300 to concentrate metal and mineral (metals) species from concentrations as low as parts per trillion to concentrations greater than parts per thousand. These high value elements are present in such water volumes as: seawater; inland saline lakes and aquifers; fracking and product water from petroleum and natural gas production; and abandoned mine water discharges.

As shown in FIGS. 33-35, primary waste water treatment system 2301 includes, in part, air heating chamber 2302, air directing tubes 2304, evaporation chamber 2306 having lower water chamber 2307 and upper evaporation chamber 2308, air mover 2310, conventional air conduit 2312, condenser 2320, condenser air inlet 2322, condenser air outlet 2324, conventional relative humidity sensors/transmitters 2326, seawater source 2030, metals-containing wastewater source 2332, product and fracking water source 2334, clean water storage 2336, concentrate storage 2338, soluble metal processing device 2340,2342, non-soluble metal processing device 2344, filter presses/dryers 2346, gravity thickener 2348, air/pure oxygen injection device 2380, and recycle line 2382. It is to be understood that primary waste water treatment system 2301 and concentrating waste water treatment system 2350 are constructed in substantially the same manner and include substantially the same components. In particular, concentrating waste water treatment system 2350 includes an air heating chamber 2352, air directing tubes 2354, an evaporation chamber 2356 having a lower water chamber 2357 and an upper evaporation chamber 2358, an air mover 2360, a conventional air conduit 2362, a condenser 2370, a condenser air inlet 2372, a condenser air outlet 2374, and conventional relative humidity sensors/transmitters 2376.

During the operation of waste water treatment system 2000, the non-potable water sources (seawater source 2030, metals-containing wastewater source 2332 and product and fracking water source 2334) is directed into the primary waste water treatment system 2301, where the flow volume upon operation is decreased by a factor of 80 to 90%.

The non-potable water from the non-potable water sources (seawater source 2030, metals-containing wastewater source 2332 and product and fracking water source 2334) is conventionally placed in evaporation chamber 2306, in particular, in lower water chamber 2307. Solar gain is then used to heat the air in air directing tubes 2304 in air heating chamber 2302. Once the desired temperature has been reached in air heating chamber 2302, air mover 2310 then causes the air in evaporation chamber 2306, in particular upper evaporation chamber 2308, to begin to move along with the air inside of air directing tubes 2304 which moves in a direction shown by arrows A.

As discussed above, the specific air flow pattern and the elongated nature of the air directing tubes 2304 provides a sufficient contact time between the air and the air directing tubes 2304 so that the air located within the air directing tubes 2304 is able to increase in temperature up to 240° F. This heating of the air in the air directing tubes 2304 will cause the air located within air directing tubes 2304 to significantly increase its capacity to hold water vapor, as discussed above.

After the air is heated in air heating chamber 2302, the heated air is transported along upper evaporation chamber 2308 so that the heated air contacts the surface of the non-potable water located in the lower water chamber 2307. The heated air interacts with the non-potable water and increases the water vapor of the heated air.

The heated air, now containing the increased amount of water vapor, is transported through the condenser air inlet 2322 of the condenser 2320. Once inside the condenser 2320, the heated air, now containing the increased amount of water vapor, is conventionally condensed so that the potable water is extracted from the heated air. The potable water is then directed to the clean water storage 2336 for future use.

It is to be understood that the metals are concentrated and remain in the evaporation chamber 2306, where they are monitored until reaching a set concentration. The concentrate is then directed to the concentrating water harvester 2356 for further concentration of the metals. The flow in the concentrating water harvester 2356 may be recycled numerous times (through the use of recycle line 2382) to further increase the concentration of the metals. With each treatment cycle, clean water is removed from the treatment stream and is directed to storage 2336.

The concentrate, containing the metals in solution, remains in the evaporation chamber 2306 of the concentrating water harvester 2356, where it is monitored and upon reaching a set concentration is directed to concentrate storage 2338 to await further processing. There will be two types of reaction streams: the first requires the metals to be precipitated prior to further processing, while the second process requires the compounds remain in solution for further processing. As many of these metals will precipitate when exposed to oxygen, a non-oxygen containing atmosphere must be maintained in each process vessel prior to distribution to final processing.

The feed streams may contain multiple metal/mineral species that can be processed separately, thereby necessitating multiple processing circuits. The advantage with using the waste water treatment system 2000 to concentrate the metals is that they can be kept in aqueous solution without chemical additions and at STP. The concentrate flows are directed from the concentrate storage 2338 into the soluble metal processing system 2340 for removal of the first metal specie. The overflow from the soluble metal processing system 2340 flows to the second part of the soluble metal processing system 2342 and so on until all the soluble metals of interest are processed. The processed metals are then sent to the filter presses/dryers 2346, as required.

When only metals that can be processed through precipitation are left in the feed stream, the flow is directed to the non-soluble metal processing system 2344. For example, these can be precipitated into carbonate or hydrogen compounds. To attain these compounds, oxygen, is injected by air/pure oxygen injection device 2380 into the process stream to complete the precipitation of the metals into hydroxides or carbonates, i.e.; calcium carbonate; ferric hydroxide, among others.

The precipitated metal compounds are directed to the thickener 2348 and upon further concentration of the solids, the precipitated metal compounds are then sent to the filter presses/dryers 2346 for final processing. It is to be understood that the non-potable water from gravity thickener 2348 can be transported to evaporation chamber 2356 through recycle line 2382 for further processing.

With respect to relative humidity sensor/transmitters 2326/2376, the relative humidity of the air is continuously monitored within each condenser chamber by the relative humidity sensor/transmitter 2326/2376. It is to be understood that the relative humidity sensors/transmitters 2326/2376 are conventionally connected and provide continuous data to the water harvester's control system (not shown). To optimize operation of the primary waste water treatment system 2301 and concentrating waste water treatment system 2350, a minimum relative humidity level is set for each chamber. When the relative humidity level exceeds the set level, a condenser module is put into operation. Conversely, if the relative humidity level drops below the set point, the condenser in that chamber is shut down allowing energy savings.

After the water vapor has been extracted from the heated air in the condenser 2320/2370, the cooled air is then transported through the condenser air outlet 2324/2374 back to the air mover 2310/2360 in order to start the process of water harvesting.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples but is to be understood in the broadest sense allowable by law.

All documents referenced herein are hereby incorporated by reference.

What I claim is:

1. A closed-loop system for producing potable water, comprising:
   a primary water harvester, comprising:
   a. a non-potable water source;
   b. a gas heating chamber, wherein the gas heating chamber includes a gas directing tube having a gas located within the gas directing tube such that the gas heating chamber is used to heat the gas located within the gas directing tube;
   c. a gas mover operatively connected to the gas directing tube for moving the heated gas contained within the gas directing tube;
   d. an evaporator operatively connected to the non-potable water source and operatively connected at one end to the gas directing tube such that the evaporator is located below the gas heating chamber, wherein the heated gas located within the gas directing tube contacts only an upper surface of the non-potable water from the non-potable water source such that a water vapor in the heated gas is increased; and
   e. a condenser operatively connected to the other end of the evaporator such that the condenser is located above the evaporator, wherein the condenser causes the water vapor to condense out of the heated gas to produce potable water.

2. The system, as in claim 1, wherein the non-potable water source is further comprised of at least one of a contaminated water source, a metal-containing water source, a mineral-containing water source, a sanitary wastewater source, an atmospheric water source, a municipal wastewater source, a seawater source, and a product and fracking water source.

3. The system, as in claim 1, wherein the gas heating chamber is further comprised of:
   an electric/natural gas-fired heater operatively connected to the gas heating chamber.

4. The system, as in claim 1, wherein the gas is further comprised of:
   Air or a noble gas or nitrogen.
5. The system, as in claim 1, wherein the evaporator is further comprised of:
   a lower water chamber, wherein a non-potable water is located within the lower water chamber; and
   an upper evaporation chamber located above the lower water chamber, wherein the heated gas is only located within the upper evaporation chamber.
6. The system, as in claim 1, wherein the condenser is further comprised of:
   at least one relative humidity sensor operatively connected to the condenser.
7. The system, as in claim 1, wherein the system is further comprised of:
   a concentrating water harvester, comprising:
   a. another concentrated non-potable water source operatively connected to the primary water harvester;
   b. another gas heating chamber, wherein the another gas heating chamber includes another gas directing tube having the gas located within the another gas directing tube such that the another gas heating chamber is used to heat the gas located within the another gas directing tube;
   c. another gas mover operatively connected to the another gas directing tube for moving the heated gas contained within the another gas directing tube;
   d. another evaporator operatively connected at one end to the another gas directing tube, wherein the heated gas located within the another gas directing tube contacts non-potable water from the primary water harvester such that a water vapor in the heated gas is increased; and
   e. another condenser operatively connected to the other end of the another evaporator, wherein the another condenser causes the water vapor to condense out of the heated gas to produce potable water.
8. The system, as in claim 7, wherein the system is further comprised of:
   a clean water storage operatively connected to the condenser and the another condenser.
9. A closed-loop water harvesting system, comprising:
   a primary water harvester, comprising:
   a. a non-potable water source;
   b. a gas heating chamber, wherein the gas heating chamber includes a gas directing tube having a gas located within the gas directing tube such that the gas heating chamber is used to heat the gas located within the gas directing tube;
   c. a gas mover operatively connected to the gas directing tube for moving the heated gas contained within the gas directing tube;
   d. an evaporator operatively connected to the non-potable water source and operatively connected at one end to the gas directing tube such that the evaporator is located below the gas heating chamber, wherein the heated gas located within the gas directing tube contacts only an upper surface of the non-potable water from the non-potable water source such that a water vapor in the heated gas is increased, wherein the evaporator includes a lower water chamber such that a non-potable water is located within the lower water chamber and an upper evaporation chamber located above the lower water chamber, wherein the heated gas is located within the upper evaporation chamber; and
   e. a condenser operatively connected to the other end of the evaporator such that the condenser is located above the evaporator, wherein the condenser causes the water vapor to condense out of the heated gas to produce potable water.
10. The system of claim 9, wherein the non-potable water source is further comprised of at least one of a contaminated water source, a metal containing water source, a mineral-containing water source, a sanitary wastewater source, an atmospheric water source, a municipal wastewater source, a seawater source, and a product and fracking water source.
11. The system of claim 9, wherein the gas heating chamber is further comprised of:
   an electric or gas-fired heater operatively connected to the gas heating chamber.
12. The system of claim 9, wherein the gas is further comprised of:
   Air or a noble gas or nitrogen.
13. The system, as in claim 9, wherein the condenser is further comprised of:
   at least one relative humidity sensor operatively connected to the condenser.
14. The system, as in claim 9, wherein the system is further comprised of:
   a concentrating water harvester, comprising:
   a. another concentrated water source operatively connected to the primary water harvester;
   b. another gas heating chamber, wherein the another gas heating chamber includes another gas directing tube having the gas located within the another gas directing tube such that the another gas heating chamber is used to heat the gas located within the another gas directing tube;
   c. another gas mover operatively connected to the another gas directing tube for moving the heated gas contained within the another gas directing tube;
   d. another evaporator operatively connected at one end to the another gas directing tube, wherein the heated gas located within the another gas directing tube contacts non-potable water from the primary water harvester such that a water vapor in the heated gas is increased; and
   e. another condenser operatively connected to the other end of the another evaporator, wherein the another condenser causes the water vapor to condense out of the heated gas to produce potable water.
15. The system, as in claim 14, wherein the system is further comprised of:
   a clean water storage operatively connected to the condenser and the another concentrating water harvester.
16. A method of making a closed-loop system for producing potable water, comprising the step of:
   providing a primary water harvester, comprising the steps of:
   a. providing a non-potable water source;
   b. providing a gas heating chamber, wherein the gas heating chamber includes a gas directing tube having a gas located within the gas directing tube such that the gas heating chamber is used to heat the gas located within the gas directing tube;
   c. providing a gas mover operatively connected to the gas directing tube for moving the heated gas contained within the gas directing tube;
   d. providing an evaporator operatively connected to the non-potable water source and operatively connected at one end to the gas directing tube such that the evaporator is located below the gas heating chamber, wherein the heated gas located within the gas directing tube contacts only an upper surface of the non-potable water from the non-potable water source such that a water vapor in the heated gas is increased; and e. providing a condenser operatively connected to the other end of the evaporator such that the condenser is located above the evaporator, wherein the condenser causes the water vapor to condense out of the heated gas to produce potable water.

17. The method, as in claim 16, wherein the step of providing an evaporator is further comprised of the steps of:

providing a lower water chamber, wherein a non-potable water is located within the lower water chamber; and providing an upper evaporation chamber located above the lower water chamber, wherein the heated gas is located within the upper evaporation chamber.

18. The method, as in claim 16, wherein the method is further comprised of the step of:

providing a concentrating water harvester, comprising the steps of:

a. providing another concentrated non-potable water source operatively connected to the primary water harvester;

b. providing another gas heating chamber, wherein the another gas heating chamber includes another gas directing tube having the gas located within the another gas directing tube such that the another gas heating chamber is used to heat the gas located within the another gas directing tube;

c. providing another gas mover operatively connected to the another gas directing tube for moving the heated gas contained within the another gas directing tube;

d. providing another evaporator operatively connected at one end to the another gas directing tube, wherein the heated gas located within the another gas directing tube contacts non-potable water from the primary water harvester such that a water vapor in the heated gas is increased; and e. providing another condenser operatively connected to the other end of the another evaporator, wherein the another condenser causes the water vapor to condense out of the heated gas to produce potable water.

19. The method, as in claim 16, wherein the method produces a concentrated BOD non-potable water source to be made available as feedstock to an anaerobic reactor for further processing into a biogas consisting of $CO_2$ and $CH_4$ to be used for electrical generation.

20. The method, as in claim 16, wherein the method produces a concentrated metal/mineral concentration to be made available as feedstock to a final processing method.

* * * * *